United States Patent
Ben-Tzur

(10) Patent No.: US 10,257,284 B2
(45) Date of Patent: *Apr. 9, 2019

(54) BROADCASTING LOCAL FUNCTION TEMPLATES TO PROXIMATE MOBILE COMPUTING DEVICES

(71) Applicant: Samsung Electronics Co., Ltd., Suwon-si, Gyeonggi-do (KR)

(72) Inventor: Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

This patent is subject to a terminal disclaimer.

(21) Appl. No.: 14/984,455

(22) Filed: Dec. 30, 2015

(65) Prior Publication Data

US 2017/0195990 A1    Jul. 6, 2017

(51) Int. Cl.
| | |
|---|---|
| *H04W 72/00* | (2009.01) |
| *H04L 29/08* | (2006.01) |
| *H04W 48/16* | (2009.01) |
| *H04W 4/02* | (2018.01) |
| *H04W 4/80* | (2018.01) |
| *H04W 4/06* | (2009.01) |

(Continued)

(52) U.S. Cl.
CPC ............. *H04L 67/146* (2013.01); *H04W 4/02* (2013.01); *H04W 4/06* (2013.01); *H04W 4/80* (2018.02); *H04W 12/06* (2013.01); *H04W 48/16* (2013.01); *H04W 64/003* (2013.01); *H04W 72/005* (2013.01); *H04W 84/12* (2013.01)

(58) Field of Classification Search
CPC ..... H04W 4/008; H04W 84/12; H04W 12/06; H04W 4/06; H04W 64/003; H04W 48/16; H04W 4/02; H04W 72/005; H04L 67/146
USPC ........................................................ 370/388
See application file for complete search history.

(56) References Cited

U.S. PATENT DOCUMENTS 8,707,442 B1 * 4/2014 Lax .................. G06F 17/30887
726/26
9,270,461 B2 * 2/2016 Giladi .............. H04N 21/26258
(Continued)

OTHER PUBLICATIONS

U.S. Appl. No. 15/245,865, filed Aug. 24, 2016, Jonathan Ben-Tzur.

*Primary Examiner* — Robert J Lopata
(74) *Attorney, Agent, or Firm* — Jefferson IP Law, LLP

(57) ABSTRACT

Techniques include broadcasting, via a local wireless network (e.g., Wi-Fi, Bluetooth, or NFC), a uniform resource locator (URL) template (e.g., an alphanumeric string) that references a software application (app) and indicates one or more operations (e.g., a function) for the app to perform based on one or more parameters (e.g., alphabetic, numeric, and/or symbolic characters). In this example, the URL template includes one or more fields (e.g., placeholders) configured to indicate the parameters. The techniques further include, in response to broadcasting the URL template, receiving, from a mobile user device (e.g., a smartphone) via the network, a URL including (e.g., generated based on) the template, where the fields include one or more user-specified parameters specified by a user of the device. The techniques also include causing the software app to perform the operations (e.g., the function) based on the user-specified parameters included in the fields of the received URL.

20 Claims, 9 Drawing Sheets

(51) Int. Cl.
  *H04W 12/06*  (2009.01)
  *H04W 64/00*  (2009.01)
  *H04W 84/12*  (2009.01)

(56) References Cited

U.S. PATENT DOCUMENTS

| | | | |
|---|---|---|---|
| 9,535,881 B1* | 1/2017 | Root | G06F 17/212 |
| 2008/0201414 A1 | 8/2008 | Amir Husain et al. | |
| 2010/0325202 A1* | 12/2010 | Rehtijarvi | H04L 67/34 |
| | | | 709/203 |
| 2011/0047557 A1* | 2/2011 | Koskimies | G06F 9/4843 |
| | | | 719/315 |
| 2011/0202603 A1 | 8/2011 | Mate et al. | |
| 2011/0289315 A1* | 11/2011 | Laitinen | G06F 21/575 |
| | | | 713/156 |
| 2012/0110138 A1* | 5/2012 | Zhang | H04L 65/4084 |
| | | | 709/219 |
| 2012/0254804 A1* | 10/2012 | Sheha | G06Q 30/02 |
| | | | 715/834 |
| 2012/0259946 A1* | 10/2012 | Stockhammer | H04L 65/105 |
| | | | 709/217 |
| 2012/0260321 A1* | 10/2012 | Wendt | H04L 9/0863 |
| | | | 726/5 |
| 2013/0283262 A1* | 10/2013 | Rehtijarvi | G06F 8/60 |
| | | | 717/178 |
| 2013/0290698 A1 | 10/2013 | Giladi et al. | |
| 2014/0092413 A1* | 4/2014 | Shibata | H04N 1/00204 |
| | | | 358/1.13 |
| 2014/0109072 A1* | 4/2014 | Lang | G06F 8/52 |
| | | | 717/168 |
| 2014/0156865 A1* | 6/2014 | Giladi | H04L 65/608 |
| | | | 709/231 |
| 2014/0164906 A1* | 6/2014 | Hassler | G06F 17/30905 |
| | | | 715/234 |
| 2014/0188989 A1 | 7/2014 | Stekkelpak et al. | |
| 2014/0200884 A1* | 7/2014 | McArthur | H04R 25/00 |
| | | | 704/206 |
| 2014/0201335 A1* | 7/2014 | Wang | H04L 65/4092 |
| | | | 709/219 |
| 2014/0207907 A1* | 7/2014 | Wang | H04L 65/602 |
| | | | 709/217 |
| 2015/0206177 A1* | 7/2015 | Yao | G06Q 30/0246 |
| | | | 705/14.45 |
| 2015/0271179 A1 | 9/2015 | Wang et al. | |
| 2015/0296274 A1 | 10/2015 | Good et al. | |
| 2015/0319252 A1* | 11/2015 | Momchilov | H04L 67/141 |
| | | | 709/223 |
| 2016/0100099 A1 | 4/2016 | Oyman et al. | |
| 2016/0188743 A1 | 6/2016 | Vaish et al. | |
| 2017/0134480 A1* | 5/2017 | Shapira | H04L 67/10 |
| 2017/0171287 A1* | 6/2017 | Famaey | H04L 67/02 |

\* cited by examiner

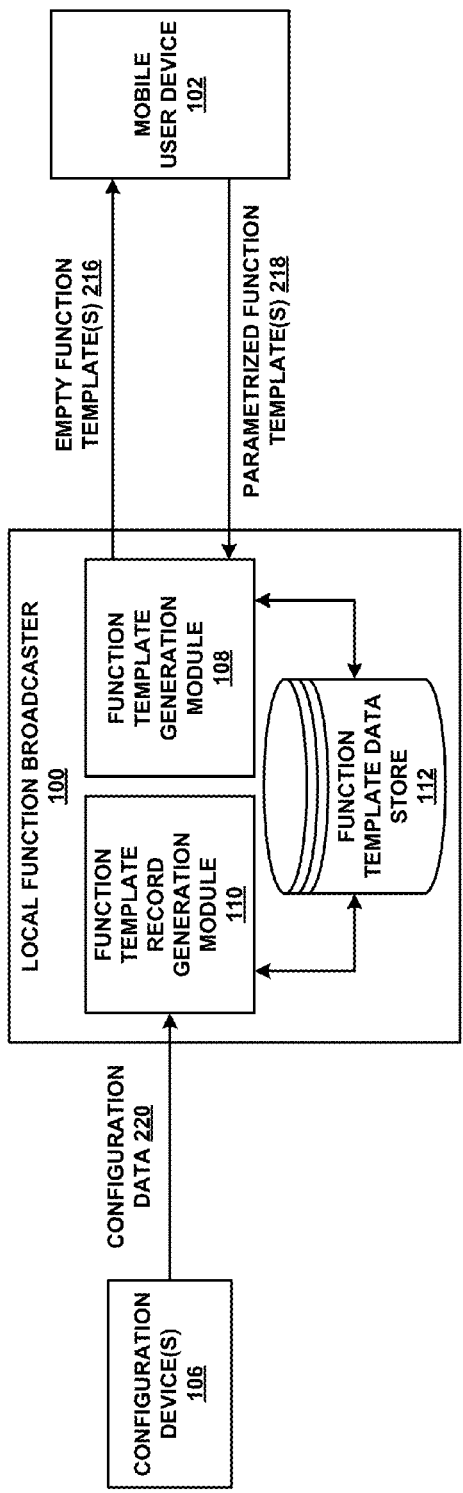
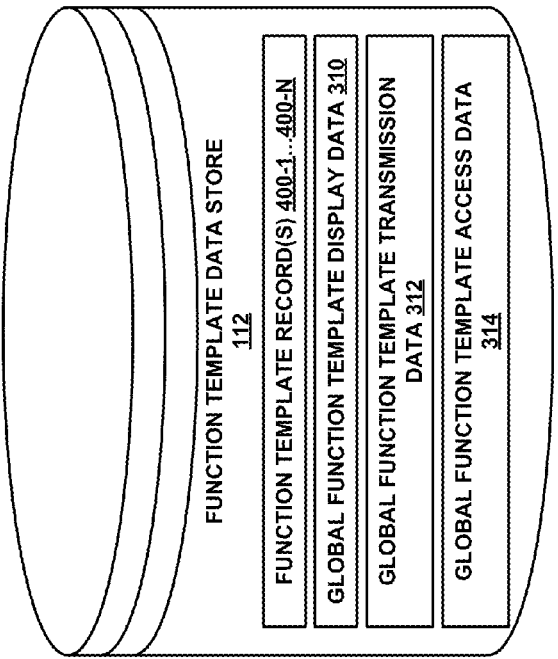
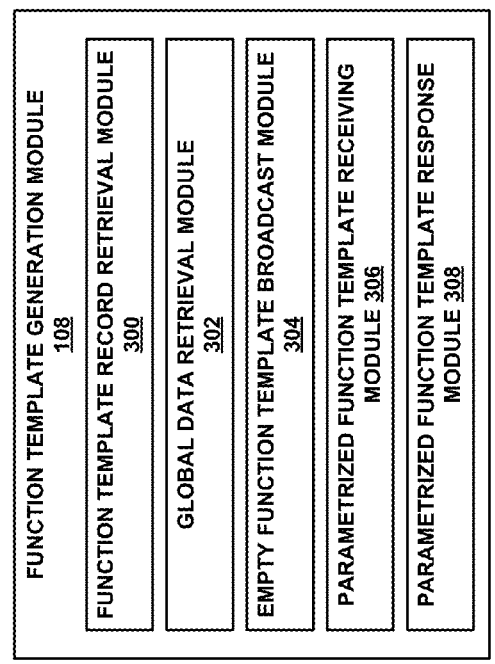
FIG. 3A
FIG. 3B
FIG. 3C

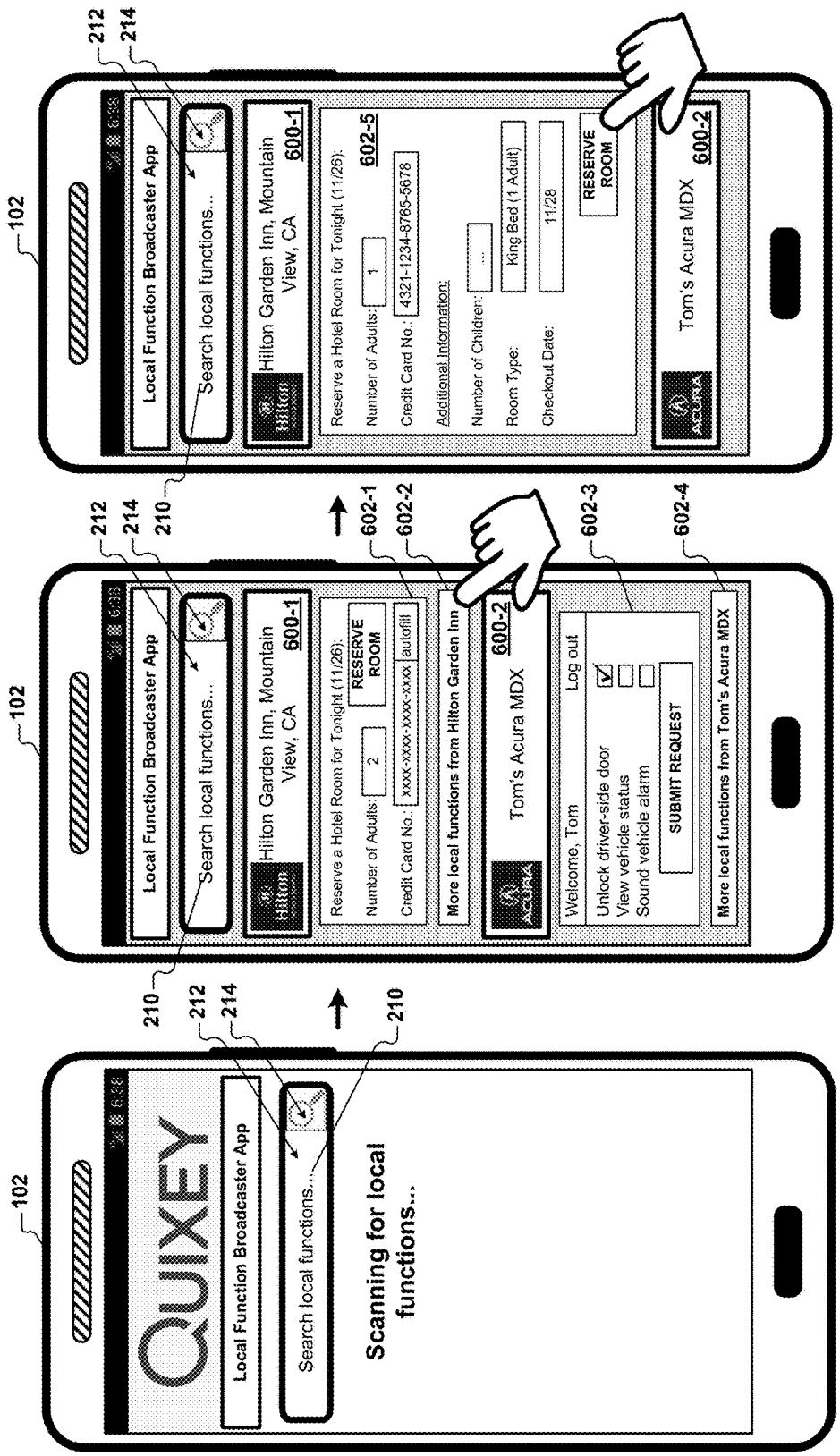

BROADCASTING LOCAL FUNCTION TEMPLATES TO PROXIMATE MOBILE COMPUTING DEVICES

TECHNICAL FIELD

This disclosure generally relates to the field of computing devices, and more particularly to techniques for performing functions using proximate computing devices.

BACKGROUND

In recent years, the use of computers, tablets, smartphones, smart watches, and other stationary and mobile computing devices has grown significantly. Additionally, the presence of network connectivity among these and other devices has also increased. Today, many consumer and industrial computing devices and appliances are capable of being connected to local computer networks and even the Internet. Using such networked and Internet-enabled computing devices, users may access a variety of products and services provided by a broad range of businesses. In some examples, to efficiently and effectively market their products and services, businesses may target specific user audiences, such as users of mobile user devices that are located geographically proximate to the businesses, products, and/or services.

SUMMARY

In one example, a method includes broadcasting, via a local wireless network, a uniform resource locator (URL) template that references a software application (app), indicates one or more operations for the app to perform based on one or more parameters, and includes one or more fields configured to include the parameters. The method further includes, in response to broadcasting the URL template, receiving, from a mobile user device via the network, a URL including the template, where the fields include one or more user-specified parameters specified by a user of the device. The method also includes causing the software app to perform the operations based on the user-specified parameters included in the fields.

In another example, a method includes receiving, at a mobile user device via a local wireless network, a URL template from a broadcasting device. In this example, the URL template references a software app, indicates one or more operations for the app to perform based on one or more parameters, and includes one or more fields configured to include the parameters. The method further includes receiving, at the user device from a user of the device, one or more user-specified parameters specified by the user. The method still further includes generating, using the user device, a URL including the URL template, where the fields include the user-specified parameters. The method also includes transmitting, using the user device via the local wireless network, the URL to the broadcasting device.

In another example, a system includes one or more computing devices configured to broadcast, via a local wireless network, a URL template that references a software app, indicates one or more operations for the app to perform based on one or more parameters, and includes one or more fields configured to include the parameters. The computing devices are further configured to, in response to broadcasting the URL template, receive, from a mobile user device via the local wireless network, a URL including the template, where the fields include one or more user-specified parameters specified by a user of the device. The computing devices are also configured to cause the software app to perform the operations based on the user-specified parameters included in the fields.

In another example, a computing device includes a network interface component configured to communicate with a local wireless network, an input/output (I/O) component configured to receive one or more user-specified parameters specified by a user of the device from the user, one or more memory components configured to store computer-readable instructions, and one or more processing units configured to execute the instructions. The instructions, when executed by the processing units, cause the units to receive a URL template from a broadcasting device via the local wireless network using the network interface component. In this example, the URL template references a software app, indicates one or more operations for the app to perform based on one or more parameters, and includes one or more fields configured to include the parameters. The instructions further cause the processing units to receive the user-specified parameters from the user using the I/O component and generate a URL including the URL template, where the fields include the user-specified parameters. The instructions also cause the processing units to transmit the URL to the broadcasting device via the local wireless network using the network interface component.

BRIEF DESCRIPTION OF DRAWINGS

The details of one or more examples are set forth in the accompanying drawings and the description below. Other features, objects, and advantages will be apparent from the description and drawings, and from the claims.

FIG. 3A is a functional block diagram of an example local function broadcaster.

FIGS. 3B-3C are functional block diagrams of an example function template generation module and an example function template data store.

FIGS. 6A-6C depict example graphical user interfaces (GUIs) that may be generated on a mobile user device according to the present disclosure.

DETAILED DESCRIPTION

Figure 1A:
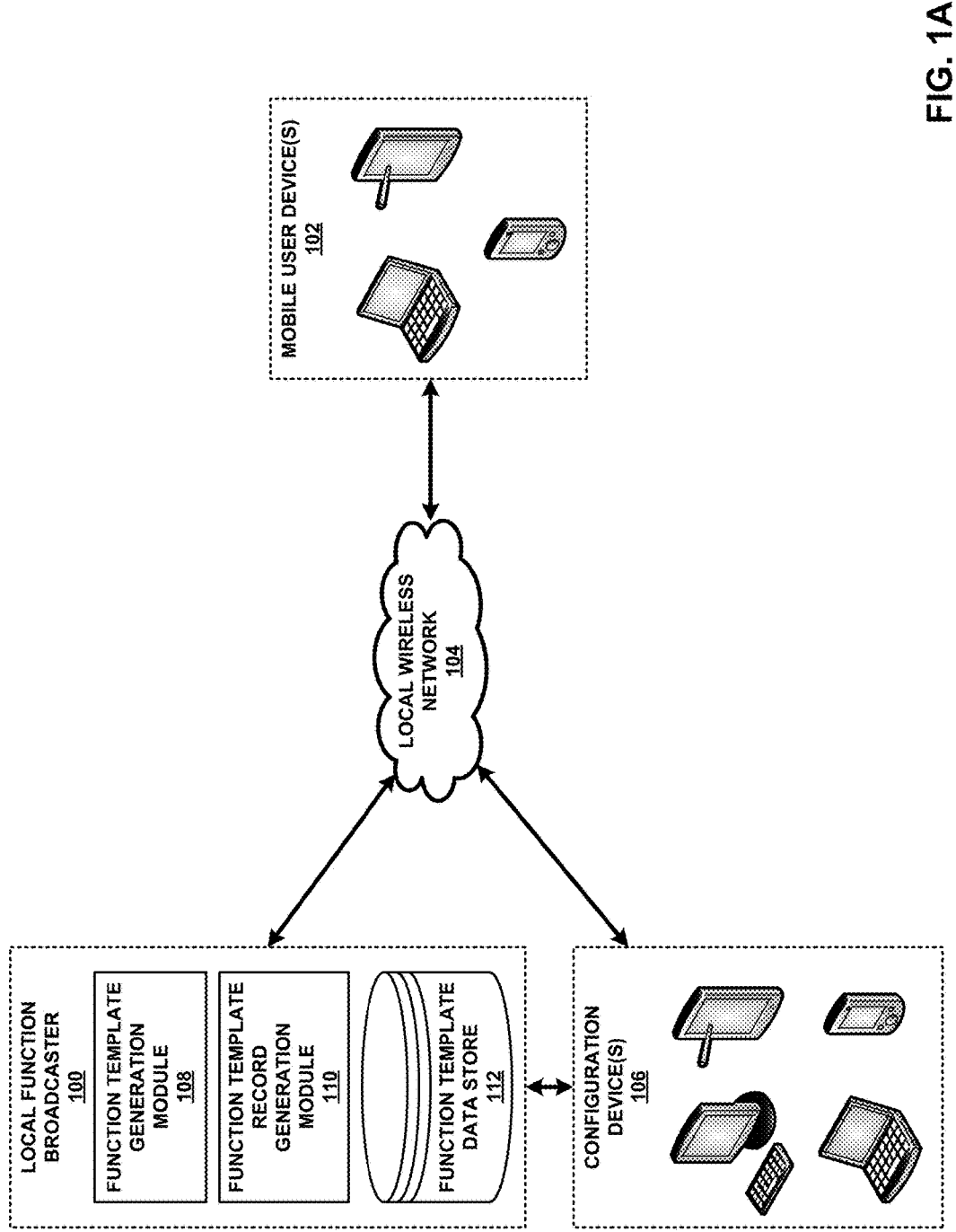
FIGS. 1A-1B each depict an example environment including a local function broadcaster and one or more mobile user devices and configuration devices that communicate via a local wireless network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of computing devices, and, more particularly, to techniques for performing various functions using proximate (e.g., nearby) computing devices. According to the techniques of this disclosure, a local function broadcaster (e.g., a system of one or more computing devices) may be configured to broadcast empty function templates (e.g., URLs) via a local wireless network. For example, each empty function template may specify a function performed by the local function broadcaster (e.g., by a software application, or "app," included on the broadcaster). In particular, each empty function template may reference a software app and indicate one or more operations for the app to perform based on one or more parameters. Each empty function template may further include one or more fields configured to include the parameters. In some examples, the local function broadcaster may be associated with (e.g., included in) a particular local business (e.g., a hotel, a coffee shop, or another business). In these examples, the local function broadcaster may be relatively stationary. In other examples, the local function broadcaster may be included in a so-called "smart" household computing device or appliance (e.g., a smart door lock, or a networked kitchen appliance) and may be relatively stationary or relatively mobile. In still other examples, the local function broadcaster may be included in a vehicle (e.g., as part of the vehicle's computing system), or in another device that may regularly change its location. The local wireless network may include any of Wi-Fi, Bluetooth, near-field communication (NFC), and/or any other short-range local wireless communication protocol, interface, or technology.

According to the disclosed techniques, one or more mobile user devices (e.g., smartphones, or smart watches) that are located proximate to the local function broadcaster (e.g., within range of the local wireless network) may be configured to receive the empty function templates from the broadcaster via the network. The mobile user devices may be further configured to display the empty function templates to users of the devices (e.g., using a graphical user interface (GUI)). The mobile user devices may be configured to, upon displaying the empty function templates, receive user-specified parameters from the users and generate parametrized function templates that include the empty function templates and the parameters. The mobile user devices may also be configured to transmit the parametrized function templates, including the user-specified parameters, to the local function broadcaster via the local wireless network.

Upon receiving the parametrized function templates from the mobile user devices via the local wireless network, the local function broadcaster may perform the functions specified by the templates. In particular, the local function broadcaster may cause the software apps referenced by the parameterized function templates to perform the operations indicated by the templates based on the user-specified parameters included in the templates.

In this manner, the techniques of the present disclosure may, in some examples, enable businesses and vendors to effectively and efficiently market various products and services to consumers. For example, the techniques may enable local function broadcasters, such as hotels, restaurants, and coffee shops, to broadcast indications of local functionality, or services, provided by the broadcasters to nearby mobile user devices. As a result, the local function broadcasters may reach local consumers who are more likely to desire the functionality or services provided by the broadcasters. The techniques may also enable other local function broadcasters, such as vehicle computing systems, networked home computing devices, and smart home appliances, to provide access to a broad range of functionality associated with the broadcasters to nearby users. As a result, the techniques may also improve user experience.

FIG. 1A is a functional block diagram that illustrates an example environment including a local function broadcaster 100 and one or more mobile user devices 102 that communicate via a local wireless network 104. The environment of FIG. 1A also illustrates one or more configuration devices 106 that also communicate with the local function broadcaster 100. As shown in FIG. 1A, the local function broadcaster 100 includes a function template generation module 108, a function template record generation module 110, and a function template data store 112 (hereinafter, the "data store 112"), which are described in greater detail herein. The local wireless network 104 through which the local function broadcaster 100 and the mobile user device(s) 102 communicate may be implemented using any (e.g., short-range) local wireless communication protocol, interface, or technology, including any of Wi-Fi, Bluetooth, NFC, ZigBee, Z-Wave, and RFID, as some examples. In this disclosure, the configuration device(s) 106 may communicate with the local function broadcaster 100 via any type of network, such as a local area network (LAN), a wide area network (WAN), and/or the Internet.

In the example of FIG. 1A, the local function broadcaster 100 may initially broadcast (e.g., transmit) an empty function template via the local wireless network 104. As described herein, the empty function template may include a URL template (e.g., an alphanumeric string) that references a software app and indicates one or more operations for the app to perform based on one or more parameters (e.g., alphabetic, numeric, and/or symbolic characters). As also described herein, the URL template may include one or more fields (e.g., placeholders) configured to include the parameters. In this example, one of the mobile user device(s) 102 may receive the empty function template (e.g., the URL template) from the local function broadcaster 100 via the local wireless network 104. The mobile user device 102 may display the empty function template (e.g., the URL template) to a user of the device 102 (e.g., via a graphical user interface (GUI)). The mobile user device 102 may receive one or more user-specified parameters (e.g., alphabetic, numeric, and/or symbolic characters) specified by the user from the user (e.g., in response to displaying the empty function template). The mobile user device 102 may generate a parametrized function template. As described herein, the parameterized function template may include a URL that includes (e.g., that is generated based on) the URL template, where the fields include the user-specified parameters. The mobile user device 102 may transmit the parameterized function template (e.g., the URL and user-specified parameters) to the local function broadcaster 100 via the local wireless network 104. As such, in response to broadcasting the empty function template, the local function broadcaster 100 may receive the parametrized function template from the mobile user device 102 via the local wireless network 104. Upon receiving the parametrized function template from the mobile user device 102, the local function broadcaster 100 may cause the software app referenced by the template (e.g., by the URL) to perform the operations indicated by the template (e.g., by the URL) based on the user-specified parameters included in the fields of the template (e.g., in the fields of the URL).

In this disclosure, an app may refer to computer software that causes a computing device (e.g., the local function broadcaster 100) to perform a task. In some examples, an app may be referred to as a "program." Example apps include hotel room reservation apps associated with specific hotels, vehicle apps associated with specific vehicles and configured to perform vehicle-related functions, and other apps. Apps can be executed on a variety of different computing devices, including stationary computing devices, such as server, workstation, and desktop computing devices. Apps can also be executed on other types of computing devices having other form factors, such as laptop computers, tablets, smartphones, or other consumer electronic devices. In some examples, apps may be installed on a computing device prior to a user purchasing the device. In other examples, the user may download and install apps on the computing device after purchasing the device. A native app, as used herein, may refer to an app that is installed and executed on a computing device (e.g., on the local function broadcaster 100). A web-based app, in turn, may refer to an app that is accessible from a computing device (e.g., on the local function broadcaster 100) via a web browser app included on the device.

A function template, as used herein, may be any alphanumeric string including alphabetic, numeric, and/or symbolic characters (e.g., punctuation marks) that references a software app and indicates one or more operations for the app to perform based on one or more parameters. In this disclosure, the function template may include one or more fields configured to include the parameters. An empty function template, as also used herein, may refer to a version of the function template where the fields do not include any of the parameters, or include a subset of the parameters, such as one or more default parameters. Because the empty function template may not include all of the parameters, the software app referenced by the template may not be able to perform the operations indicated by the template (e.g., the empty function template may be invalid due to the missing parameters). A parametrized function template, as further used herein, may refer to the function template where the fields include the parameters. As described herein, one or more of the parameters included in the parametrized function template may be user-specified parameters that are specified by a user of one of the mobile user device(s) 102. Because the parametrized function template may include all of the parameters, the software app referenced by the template may be able to perform the operations indicated by the template (e.g., the parametrized function template may be valid and include all required parameters).

In some examples, the function template may reference a web-based app (e.g., a website). For example, the function template may be a resource identifier that can be processed using a web browser app by a wide variety of computing devices that use different operating systems. In some examples, the function template may include a uniform resource locator (URL) (e.g., a web address) used with the hypertext transfer protocol (HTTP). For example, the function template may be a URL that is optimized for a desktop website (e.g., a so-called "full" site) or a mobile device website. In these examples, in response to receiving the function template, the local function broadcaster 100 may launch a web browser app and access the resource indicated by the resource identifier. In other examples, the function template may reference a native app. For example, the function template may include a URL-like structure configured to reference a native app and indicate one or more operations (e.g., a function) for the app to perform. In these examples, a first portion of the function template may reference the native app. Also in these examples, a second portion (e.g., a substring) of the function template (e.g., following the first portion) may indicate the operations for the native app to perform. For example, the second portion of the function template may cause the native app to retrieve and process information included in a domain and path defined by the second portion. In these examples, in response to receiving the function template, the local function broadcaster 100 may launch the native app and retrieve and process the information as indicated by the template.

In some examples, the local function broadcaster 100 may also broadcast parameter data via the local wireless network 104 (e.g., with the empty function template, or separately). In these examples, the parameter data may indicate, for at least one of the fields included in the empty function template (e.g., in the URL template), that the field is required to include a parameter (e.g., that the field is a so-called "required" field). In these examples, the field of the parametrized function template (e.g., the URL) indicated by the parameter data may include at least one of the user-specified parameters included the fields of the template. In other examples, the parameter data may indicate, for at least one of the fields included in the empty function template (e.g., in the URL template), one or more example parameters (e.g., actual parameters, or parameter ranges) that may be included in the field. In these examples, at least one of the user-specified parameters included in the fields of the parametrized function template (e.g., the URL) may be one of the example parameters indicated by the parameter data. For example, the mobile user device 102 may receive the parameter data from the local function broadcaster 100 via the local wireless network 104. The mobile user device 102 may display an indication of the example parameters to the user (e.g., as part of a GUI). The mobile user device 102 may then receive a selection of the indication of the example parameters (e.g., of the GUI) from the user as part of receiving the user-specified parameters from the user. In still other examples, the local function broadcaster 100 may broadcast the empty function template such that the template includes, in at least one of the fields included in the template (e.g., in the URL template), a default parameter that may be included in the field (e.g., which the user may or may not change).

In some examples, the local function broadcaster 100 may further broadcast access data via the local wireless network 104 (e.g., with the empty function template, or separately). In some examples, the access data may indicate one or more conditions under which the mobile user device 102 may receive the empty function template (e.g., the URL template) via the local wireless network 104 and/or access the template (e.g., the URL template) upon receiving the template. In other examples, the access data may be configured to enable the mobile user device 102 to receive the empty function template via the local wireless network 104 and/or access the template upon receiving the template. For example, the mobile user device 102 may receive the access data from the local function broadcaster 100 via the local wireless network 104. The mobile user device 102 may then receive the empty function template via the local wireless network 104 and/or access the template upon receiving the template based on the access data.

In still other examples, the local function broadcaster 100 may receive from the mobile user device 102 via the local wireless network 104 authentication data indicating that the device 102 may receive the empty function template via the local wireless network 104 and/or access the template upon receiving the template. For example, the mobile user device 102 may determine that the device 102 may receive the empty function template via the local wireless network 104 and/or access the template upon receiving the template (e.g., based on access data). The mobile user device 102 may then transmit to the local function broadcaster 100 via the local wireless network 104 authentication data indicating that the device 102 may receive the empty function template via the network 104 and/or access the template upon receiving the template. In these examples, the local function broadcaster 100 may cause the software app referenced by the parameterized function template (e.g., the URL) to perform the operations indicated by the template based on the authentication data (and, e.g., based on access data).

In some examples, the parametrized function template (e.g., the URL) may further include one or more additional fields that include one or more additional user-specified parameters specified by the user. For example, the mobile user device 102 may receive one or more additional user-specified parameters specified by the user from the user. In this example, the mobile user device 102 may generate the parametrized function template to include one or more additional fields that include the additional user-specified parameters. Also in these examples, the local function broadcaster 100 may cause the software app referenced by the parameterized function template (e.g., the URL) to perform the operations indicated by the template based on the additional user-specified parameters included in the additional fields.

In additional examples, upon receiving the empty function template from the local function broadcaster 100 via the local wireless network 104, the mobile user device 102 may display an indication of a geographic location of the broadcaster 100 to the user (e.g., an icon, or another graphic associated with the broadcaster 100 within a map native app of the device 102).

The local function broadcaster 100 may be any one or more computing devices capable of broadcasting empty function templates via the local wireless network 104, receiving parametrized function templates from the mobile user device(s) 102 via the network 104, and receiving configuration data from the configuration device(s) 106. As described herein, the local function broadcaster 100 may include any stationary or mobile computing devices capable of communicating via the local wireless network 104 (and, e.g., via one or more other networks, such as the Internet), including one or more server computers, desktop computers, laptop computers, tablet computers, smartphones, and any number of other computing devices. In some examples, the local function broadcaster 100 may include any of networked printers, routers, smart televisions, gaming consoles, wireless speakers, home thermostats, light switches, refrigerators, microwaves, toasters, and other home and kitchen devices and appliances. In this disclosure, the local function broadcaster 100 may also be referred to as a broadcasting device.

Figure 2:
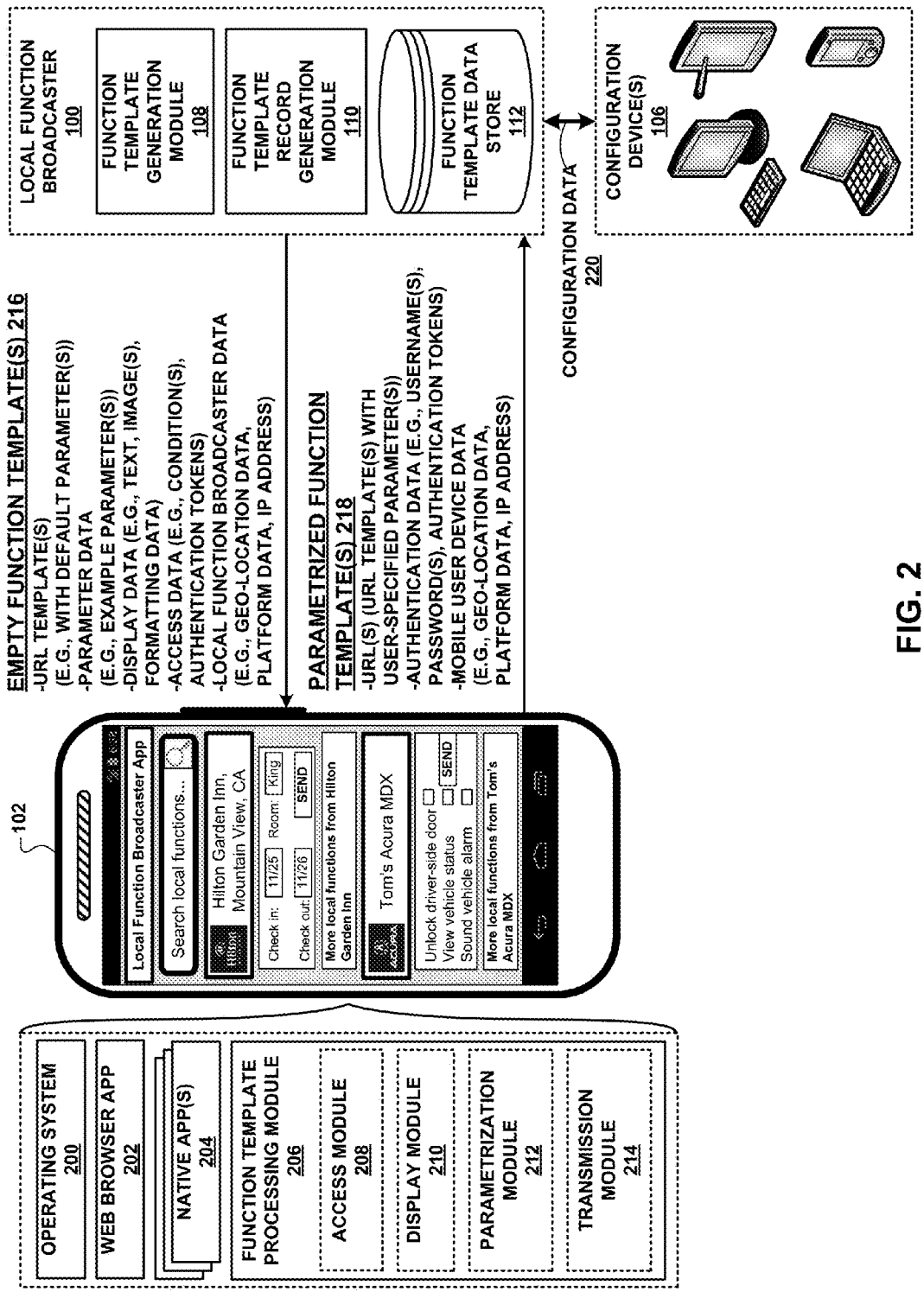
FIG. 2 depicts an example mobile user device in communication with an example local function broadcaster.

The mobile user device(s) 102 may be any computing devices capable of receiving empty function templates from the local function broadcaster 100 via the local wireless network 104, receiving user-specified parameters from users of the device(s) 102, generating parametrized function templates using the empty function templates and the parameters, and transmitting the parametrized function templates to the broadcaster 100 via the network 104. The mobile user device(s) 102 may include any of smart watches, smartphones, and tablet or laptop computing devices. The mobile user device(s) 102 may also include computing devices having other form factors, e.g., wirelessly-networked desktop computers, vehicle navigation systems, gaming devices, and smart televisions. The mobile user device(s) 102 may use a variety of different operating systems or platforms (e.g., an operating system, or "OS," 200, as shown in FIG. 2). In some examples, a mobile user device 102 may operate using an OS such as ANDROID® by Google Inc., IOS® by Apple Inc., or WINDOWS PHONE® by Microsoft Corporation. In other examples, the mobile user device 102 may operate using an OS such as MICROSOFT WINDOWS® by Microsoft Corporation, MAC OS® by Apple Inc., or LINUX® (LINUX is the registered trademark of Linus Torvalds in the U.S. and other countries). The mobile user device(s) 102 may interact with the local function broadcaster 100 using operating systems other than those described herein, whether presently available or developed in the future.

The mobile user device(s) 102 may communicate with the local function broadcaster 100 via the local wireless network 104. In general, the mobile user device(s) 102 may communicate with the local function broadcaster 100 using any app that can receive empty function templates from the broadcaster 100, receive user-specified parameters from users of the device(s) 102, and transmit parameterized function templates including the empty function templates and the parameters to the broadcaster 100. In some examples, the mobile user device(s) 102 may include a local function broadcaster app that is dedicated to interfacing with the local function broadcaster 100, such as an app dedicated to searching for (e.g., detecting) local functions (e.g., any of one or more native apps 204, as also shown in FIG. 2). In other examples, the mobile user device(s) 102 may communicate with the local function broadcaster 100 using a more general app, such as a web browser app (e.g., a web browser app 202, as further shown in FIG. 2). In general, an app included on a mobile user device 102 to communicate with the local function broadcaster 100 may be configured to display a GUI used to display empty function templates received from the broadcaster 100 and enable a user of the device 102 to interact with the displayed templates. The GUI may display the empty function templates in a variety of different ways, depending on the information that the local function broadcaster 100 broadcasts to the mobile user device 102 via the local wireless network 104.

The configuration device(s) 106 may be any computing devices capable of receiving configuration data from users of the device(s) 106 (e.g., advertisers) and transmitting the data to the local function broadcaster 100. For example, the configuration device(s) 106 may be any computing devices capable of receiving indications of URL templates, parameter data (e.g., required, optional, and/or default parameters), and function template display, transmission, and/or access data from the users and transmitting this information to the local function broadcaster 100. In some examples, the configuration device(s) 106 may provide a GUI (e.g., a menu including one or more data fields) that enables the users of the device(s) 106 to specify the configuration data and transmit the data to the local function broadcaster 100.

Figure 1B:
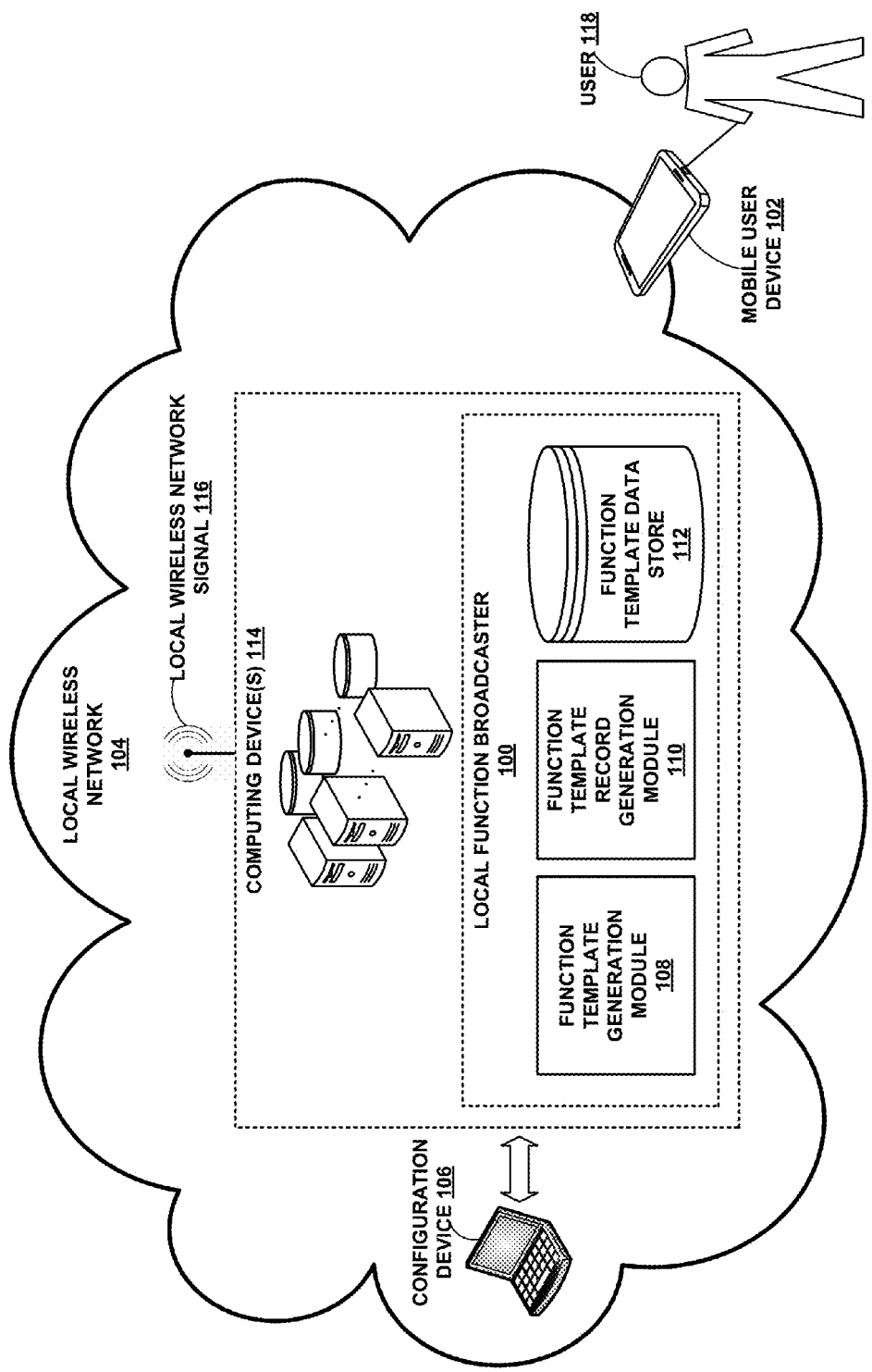

FIG. 1B illustrates another example environment that includes one of the mobile user device(s) 102, the local function broadcaster 100, and the configuration device(s) 106. As shown in FIG. 1B, the local function broadcaster 100, including the function template generation module 108, function template record generation module 110, and data store 112, may be implemented as part of a system of one or more computing devices 114. The computing devices 114 may be one or more server computing devices configured to implement the techniques described herein. As also shown, the computing devices 114 may be configured to implement the local wireless network 104. For example, the computing devices 114 may include one or more network interface components (e.g., a local wireless network interface component, such as a Wi-Fi, Bluetooth, or NFC radio transceiver) configured to establish the local wireless network 104. In the example of FIG. 1B, the mobile user device 102 is located within range of the local wireless network 104. Specifically, the mobile user device 102 is located within range of a local wireless network signal 116 associated with the local wireless network 104 such that the device 102 may receive broadcasts (e.g., empty function templates) from the local function broadcaster 100 (e.g., from the computing devices 114) via the network 104 and transmit data (e.g., parametrized function templates including parameters) specified by a user 118 of the device 102. Also in this example, the configuration device(s) 108 may be configured to communicate with the local function broadcaster 100 (e.g., with the computing devices 114) via the local wireless network 104, or using any other network, such as a LAN, a WAN, and/or the Internet.

FIG. 2 illustrates an example of one of the mobile user device(s) 102 in communication with the local function broadcaster 100. FIG. 2 also illustrates the configuration device(s) 106 in communication with the local function broadcaster 100. Specifically, FIG. 2 depicts example interactions and data exchanged among the mobile user device 102, local function broadcaster 100, and configuration device(s) 106. As shown in FIG. 2, the mobile user device 102 may receive one or more empty function templates 216 from the local function broadcaster 100 via the local wireless network 104. For example, the mobile user device 102 may include a local function broadcaster app (e.g., one of the native app(s) 204) configured to receive the empty function templates 216. As shown, the empty function templates 216 may include one or more URL templates. As described herein, each URL template may reference a software (e.g., a native or web-based) app and indicate one or more operations (e.g., a function) for the app to perform based on one or more parameters (e.g., alphabetic, numeric, and/or symbolic characters). As also described herein, each URL template may include one or more fields (e.g., placeholders) configured to include the parameters. As further shown, the empty function templates 216 may include parameter data. In some examples, the parameter data may indicate one or more (e.g., so-called "required") fields of the URL templates that are required to include parameters. In other examples, the parameter data may indicate one or more (e.g., so-called "optional") fields of the URL templates that may or may not include parameters. In still other examples, the parameter data may indicate one or more example parameters (e.g., sets of one or more parameters, or parameter ranges) that may be included in the fields of the URL templates. In additional examples, the parameter data may indicate one or more default parameters that may be included in the fields of the URL templates. In some examples, the URL templates may include the default parameters indicated by the parameter data in the fields of the templates. As also shown, the empty function templates 216 may include one or more of display (e.g., text, image, and/or formatting) data and access data (e.g., one or more conditions, usernames, passwords, and/or authentication tokens). The mobile user device 102 may use the display data to display the URL templates to the user. For example, the mobile user device 102 may display each URL template to the user as a function result that includes and/or is generated based on the display data. Examples of URL templates displayed to a user of a mobile user device 102 as function results are described with reference to FIGS. 6A-6C. The mobile user device 102 may use the access data to determine whether the device 102 is able to receive and/or access the URL templates and, if so, to enable the device 102 to receive and/or access the templates. In some examples, the access data may indicate one or more conditions (e.g., a date, a time of day, an OS of the mobile user device 102, a device type of the device 102, or other information) under which the device 102 may receive and/or access the URL templates. In other examples, the access data may indicate that, to receive and/or access the URL templates, the mobile user device 102 is required to have a user account (e.g., a username and a password) or other credentials (e.g., an authentication token) associated with the templates (e.g., with the software app referenced by the templates) and/or with the local function broadcaster 100. For example, the access data may include authentication information (e.g., an authentication token) that the mobile user device 102 may use to receive and/or access the URL templates. As described herein, in some examples, the mobile user device 102 may also transmit authentication information (e.g., a username and a password, or another authentication token) to the local function broadcaster 100 to indicate to the broadcaster 100 that the device 102 has the user account or other credentials required to receive and/or access the URL templates. As shown in FIG. 2, in some examples, the empty function templates 216 may further include information associated with the local function broadcaster 100, including, e.g., geo-location data, platform data, and/or other data (e.g., an IP address) associated with the broadcaster 100.

As shown in FIG. 2, the mobile user device 102 (e.g., the local function broadcaster app) may display the empty function templates 216 (e.g., the URL templates) to a user of the device 102. For example, the mobile user device 102 may display the empty function templates 216 to the user as one or more function results each including one or more GUI elements (e.g., using the display data). In some examples, the GUI elements may correspond to the fields of the empty function templates 216 (e.g., the URL templates). For example, the GUI elements may be graphical representations of the fields that the user may select to specify parameters to be included in the fields. Upon displaying the empty function templates 216 to the user, the mobile user device 102 (e.g., the local function broadcaster app) may receive one or more user-specified parameters (e.g., alphabetic, numeric, and/or symbolic characters) specified by the user from the user. For example, the user may enter the user-specified parameters into the GUI elements of the function results displayed to the user (e.g., by selecting user-selectable links included in the elements and specifying the parameters to be included in the corresponding fields).

Upon receiving the user-specified parameters from the user, the mobile user device 102 (e.g., the local function broadcaster app) may generate one or more parametrized function templates 218 that include the empty function templates 216 (e.g., the URL templates) and the user-specified parameters in the fields of the empty function templates 216 (e.g., the URL templates). The mobile user device 102 (e.g., the local function broadcaster app) may transmit the parameterized function templates 218 to the local function broadcaster 100 via the local wireless network 104. Upon receiving the parametrized function templates 218 from the mobile user device 102, the local function broadcaster 100 may cause the software apps referenced by the templates 218 to perform the operations (e.g., functions) indicated by the templates 218 based on the user-specified parameters included in the fields of the templates 218. In some examples, the local function broadcaster 100 may initially launch each software app and subsequently cause the app to perform the corresponding operations (e.g., function).

For example, the mobile user device 102 may receive and display the empty function templates 216 and generate and transmit the parametrized function templates 218 using a function template processing module 206 included on the device 102. In some examples, the function template processing module 206 may include an access module 208 configured to use the received access data to determine whether the mobile user device 102 is able to receive and/or access the empty function templates 216 and, if so, enable the device 102 to receive and/or access the templates 216. In other examples, the function template processing module 206 may include a display module 210 configured to use the received display data to display the empty function templates 216 to the user as one or more function results. In still other examples, the function template processing module 206 may include a parametrization module 212 configured to generate the parametrized function templates 218 including the empty function templates 216 and the user-specified parameters. Additionally, or alternatively, the function template processing module 206 may include a transmission module 214 configured to transmit the parameterized function templates 218 to the local function broadcaster 100.

As shown in FIG. 2, the mobile user device 102 may include an OS 200 configured to perform any of the functions attributed to the device 102 herein. For example, the OS 200 may be configured to receive user inputs (e.g., user-specified parameters and selections of user-selectable links displayed on the mobile user device 102) from users of the device 102 and provide user outputs (e.g., display empty function templates 216) to the users. The OS 200 may be further configured to enable the mobile user device 102 to communicate with other systems or devices (e.g., receive empty function templates 216 from the local function broadcaster 100 and transmit parameterized function templates 218 to the broadcaster 100). As further shown, the mobile user device 102 may also include a web browser app 202 configured to access states of web-based apps (e.g., web pages, or websites). As also shown, the mobile user device 102 may include one or more native apps 204 that may execute (e.g., be installed) on the device 102.

FIG. 3A is a conceptual diagram that illustrates example interactions between one of the mobile user device(s) 102, the local function broadcaster 100, and one or more of the configuration device(s) 106. The local function broadcaster 100 of FIG. 3A includes the function template generation module 108, the function template record generation module 110, and the data store 112. As shown in FIG. 3A, the local function broadcaster 100 may broadcast (e.g., transmit) one or more empty function templates 216 to the mobile user device 102 via the local wireless network 104. As described herein, each empty function template 216 may correspond to a URL template (e.g., an alphanumeric string) that references a software (e.g., native or web-based) app and indicates one or more operations (e.g., a function) for the app to perform based on one or more parameters (e.g., alphabetic, numeric, and/or symbolic characters). As also described herein, the URL template may include one or more fields (e.g., placeholders) configured to include the parameters. The local function broadcaster 100 may initially generate the empty function templates 216 (e.g., the URL templates) using information included in the data store 112 and subsequently broadcast the templates 216 to the mobile user device 102. For example, the function template generation module 108 may generate the empty function templates 216 using data included in one or more function template records stored in the data store 112. Specifically, the function template generation module 108 may retrieve the function template records from the data store 112 and select the empty function templates 216, including URL templates, parameter data, and other information (e.g., display data, transmission data, and access data) from the records. The function template generation module 108 may identify the function template records in the data store 112 and generate the empty function templates 216 based on data included in the records using any of a variety of considerations. In some examples, the function template generation module 108 may identify the function template records and generate the empty function templates 216 in response to an event (e.g., a user input, or a specific state of the local function broadcaster 100). Additionally, or alternatively, the function template generation module 108 may identify the function template records and generate the empty function templates 216 automatically (e.g., at regular time intervals). For example, the function template generation module 108 may identify the function template records and generate the empty function templates 216 based on a timed event (e.g., using an output of a timer of a software app included on the local function broadcaster 100). In some examples, as described herein, the function template generation module 108 may identify the function template records and generate the empty function templates 216 based on (e.g., global) function template transmission data included in the records and/or the data store 112.

As shown in FIG. 3A, the data (e.g., the URL templates and parameter data) included in the function template records of the data store 112 may be specified by one or more users of the configuration device(s) 106. For example, the users of the configuration device(s) 106 may be associated with the local function broadcaster 100 (e.g., the users may operate the broadcaster 100 or a system of one or more computing devices that includes the broadcaster 100). In some examples, the configuration device(s) 106 may communicate with the local function broadcaster 100 via the local wireless network 104. In other examples, the configuration device(s) 106 may communicate with the local function broadcaster 100 via another network, such as a LAN, a WAN, and/or the Internet. In particular, the users may transmit configuration data 220 indicating one or more empty function templates 216 (e.g., URL templates, parameter data, and/or other information) to the local function broadcaster 100 using the configuration device(s) 106. Upon receiving the configuration data 220 from the configuration device(s) 106 (e.g., the users), the function template record generation module 112 may generate one or more function template records that include the data 220 and store the records in the data store 112.

As also shown in FIG. 3A, the mobile user device 102 may receive the empty function templates 216 from the local function broadcaster 100 via the local wireless network 104 and display the templates 216 to a user of the device 102. The mobile user device 102 may then parametrize the empty function templates 216 to generate one or more parameterized function templates 218 and transmit the parameterized function templates 218 to the local function broadcaster 100 via the local wireless network 104. As described herein, each parametrized function template 218 may correspond to a URL (e.g., an alphanumeric string) that references a software (e.g., native or web-based) app and indicates one or more operations (e.g., a function) for the app to perform based on one or more parameters (e.g., alphabetic, numeric, and/or symbolic characters) included in one or more fields of the URL. For example, as also described herein, the mobile user device 102 may receive one or more user-specified parameters (e.g., alphabetic, numeric, and/or symbolic characters) specified by the user from the user and generate the parameterized function templates 218 using the empty function templates 216 and the received parameters. Specifically, as further described herein, the mobile user device 102 may generate each parameterized function template 218 (e.g., a URL) to include one of the empty function templates 216 (e.g., a URL template) and the user-specified parameters in the fields of the empty function template 216 (e.g., the fields of the URL template).

FIG. 3B is a functional block diagram of an example function template generation module 108. The function template generation module 108 of FIG. 3B includes a function template record retrieval module 300 configured to retrieve one or more function template records included in the data store 112. In some examples, the function template record retrieval module 300 may retrieve the function template records based on information (e.g., function template transmission data) included in the records. For example, each function template record included in the data store 112 may indicate date data (e.g., one or more dates, or a range of dates), time data (e.g., one or more times, or a range or a duration of time), and/or other data that indicates when and/or how frequently the empty function template 216 specified by the record is generated and broadcast via the local wireless network 104 by the local function broadcaster 100. In these examples, at a particular point in time, the function template record retrieval module 300 may retrieve those of the function template records that indicate that the empty function template 216 specified by each record is to be generated and broadcast at that point in time. In other examples, the function template record retrieval module 300 may retrieve the function template records based on other information (e.g., global function template transmission data) included in the data store 112. For example, the data store 112 may indicate so-called "global" date data, time data, and/or other data that indicates when and/or how frequently the empty function templates 216 specified by multiple ones (e.g., all) of the function template records included in the data store 112 are generated and broadcast via the local wireless network 104 by the local function broadcaster 100. For example, as shown in FIG. 3B, the function template generation module 108 may include a global data retrieval module 302 configured to retrieve the global data from the data store 112. In these examples, at a particular point in time, the function template record retrieval module 300 may determine whether to retrieve, or to refrain from retrieving, any of the function template records included in the data store 112 based on the global data. For example, the global data may indicate whether, at this point in time, any of the function template records are to be retrieved and the corresponding empty function templates 216 are to be generated and broadcast as described herein. In some examples, the global data retrieval module 302 may be configured to retrieve other information (e.g., global function template display and/or access data) from the data store 112, as described with reference to FIG. 3C.

As shown in FIG. 3B, the function template generation module 108 may further include an empty function template broadcast module 304, a parameterized function template receiving module 306, and a parameterized function template response module 308. The empty function template broadcast module 304 may be configured to broadcast (e.g., transmit) via the local wireless network 104 empty function templates 216 specified by (e.g., selected from) function template records that have been retrieved from the data store 112 by the function template record retrieval module 300. For example, the empty function template broadcast module 304 may include any of hardware, software, and/or firmware components (e.g., a network interface component, such as a Wi-Fi, Bluetooth, or NFC adapter) configured to broadcast the empty function templates 216 via the local wireless network 104.

The parameterized function template receiving module 306 may be configured to receive via the local wireless network 104 parametrized function templates 218 from the mobile user device(s) 102. For example, the parametrized function template receiving module 306 may include any of hardware, software, and/or firmware components (e.g., a network interface component, such as a Wi-Fi, Bluetooth, or NFC adapter) configured to receive the parametrized function templates 218 via the local wireless network 104. In some examples, the empty function template broadcast module 304 and the parameterized function template receiving module 306 may be a part of a common network interface component (e.g., a network adapter).

The parameterized function template response module 308 may be configured to perform the functions associated with the parametrized function templates 218 received by the parameterized function template receiving module 306 from the mobile user device(s) 102. As described herein, each received parametrized function template 218 may reference a software app and indicate one or more operations for the app to perform based on one or more user-specified parameters included in one or more fields of the template 218. Accordingly, the parameterized function template response module 308 may be configured to, for each received parametrized function template 218, cause the software app referenced by the template 218 to perform the operations indicated by the template 218 based on the user-specified parameters included in the fields of the template 218. In some examples, the parameterized function template response module 308 may be configured to first launch the software app on the local function broadcaster 100 and subsequently cause the app to perform the operations.

FIG. 3C is a functional block diagram of an example data store 112. The data store 112 of FIG. 3C includes one or more function template records (e.g., 400-1 . . . 400-N, where "N" is an integer value greater or equal to 1) that specify (e.g., include information associated with) one or more empty function templates 216. Example function template records are described with reference to FIGS. 4A-4B. Example empty function templates 216 are described with reference to FIGS. 5A-5C. The data store 112 may include one or more databases, (e.g., inverted) indices, files, or other data structures used to implement the disclosed techniques.

As shown in FIG. 3C, the data store 112 may also include global function template display data 310, global function template transmission data 312, and global function template access data 314. The global function template display data 310 may include any of text, image, audio, video (e.g., animation), and formatting (e.g., rendering) data. For example, the global function template display data 310 may specify one or more standard GUI elements (e.g., including text, image, formatting, and/or other data) that the mobile user device(s) 102 may use, at least in part, to display the empty function templates 216 specified by multiple (e.g., all) function template records included in the data store 112. With reference to FIG. 3B, the global data retrieval module 302 may be configured to retrieve the global function template display data 310 from the data store 112. The empty function template broadcast module 304 may be configured to broadcast the global function template display data 310 via the local wireless network 104, e.g., along with the empty function templates 216. Upon receiving the empty function templates 216 and the global function template display data 310 via the local wireless network 104, the mobile user device(s) 102 may be configured to use the data 310 to display the templates 216 to the users of the device(s) 102 (e.g., as function results including GUI elements).

The global function template transmission data 312 may indicate any information related to whether and when the function template records included in the data store 112 are retrieved and the corresponding empty function templates 216 are generated and broadcast, as described with reference to FIG. 3B. For example, the global function template transmission data 312 may include date data, time data, and/or other information that indicates when and/or how frequently the empty function templates 216 specified by multiple (e.g., all) function template records included in the data store 112 are generated and broadcast via the local wireless network 104 by the local function broadcaster 100. For example, with reference to FIG. 3B, the global data retrieval module 302 may be configured to retrieve the global function template transmission data 312 from the data store 112. In this example, the function template record retrieval module 300 may be configured to retrieve the function template records included in the data store 112 based the retrieved global function template transmission data 312.

The global function template access data 314 may include any information that indicates which of the mobile user device(s) 102 are able to receive and/or access the empty function templates 216 broadcast via the local wireless network 104 by the local function broadcaster 100. For example, the global function template access data 314 may indicate whether the mobile user device(s) 102 may receive and/or access the empty function templates 216 with or without user account credentials, such as usernames, passwords, or authentication tokens. With reference to FIG. 3B, the global data retrieval module 302 may be configured to retrieve the global function template access data 314 from the data store 112. The empty function template broadcast module 304 may be configured to broadcast the global function template access data 314 via the local wireless network 104, e.g., along with the empty function templates 216. In some examples, upon receiving the empty function templates 216 and the global function template access data 314 via the local wireless network 104, each of the mobile user device(s) 102 may be configured to determine whether the device 102 is able to access the received templates 216 (e.g., to display the templates 216 to a user) using the data 314. For example, the mobile user device 102 may determine whether the empty function templates 216 are accessible to all mobile user device(s) 102, or whether the device 102 is associated with user account credentials (e.g., usernames, passwords, or authentication tokens) that allow the device 102 to access the templates 216, as indicated by the global function template access data 314. In the event that the mobile user device 102 is able to access the empty function templates 216, the device 102 may display the templates 216 to the user, or otherwise refrain from doing so. In other examples, the mobile user device 102 may be configured to initially receive the global function template access data 314 via the local wireless network 104 and subsequently determine whether the device 102 is able to receive the empty function templates 216 via the network 104 using the data 314. In the event that the mobile user device 102 is able to receive the empty function templates 216, the device 102 may receive the templates 216 and display the templates 216 to the user, or otherwise refrain from doing so.

In additional examples, the mobile user device 102 may receive and/or access the empty function templates 216 in the manner described herein by determining that the device 102 is able to receive and/or access the templates 216 using the global function template access data 314 and user account credentials (e.g., usernames, passwords, or authentication tokens) associated with the device 102. In these examples, the mobile user device 102 may generate the parameterized function templates 218 to indicate (e.g., to include) the user account credentials and transmit the templates 218 to the local function broadcaster 100 via the local wireless network 104. Upon receiving the parametrized function templates 218, including the user account credentials, from the mobile user device 102, the parameterized function template receiving module 306 may initially authenticate the device 102 based on the credentials indicated in the templates 218. Upon the mobile user device 102 being authenticated, the parameterized function template response module 308 may then proceed to perform the operations indicated by the parametrized function templates 218 received from the device 102.

Figure 4B:
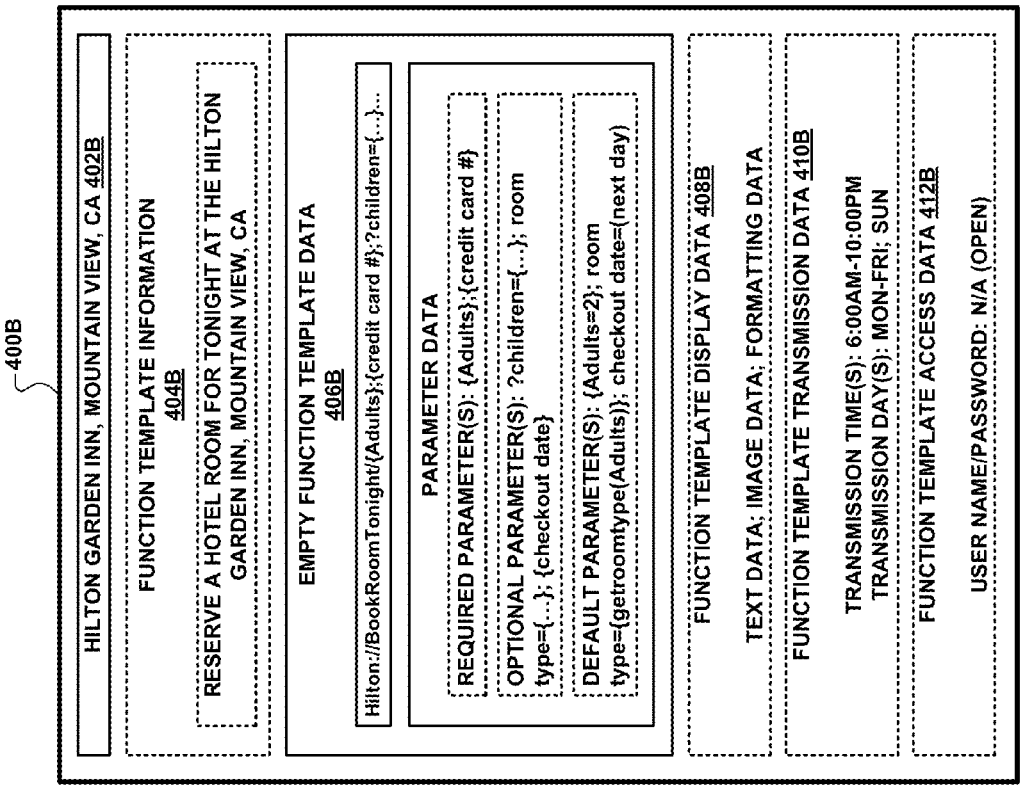
FIGS. 4A-4B depict example function template records.
Figure 4A:
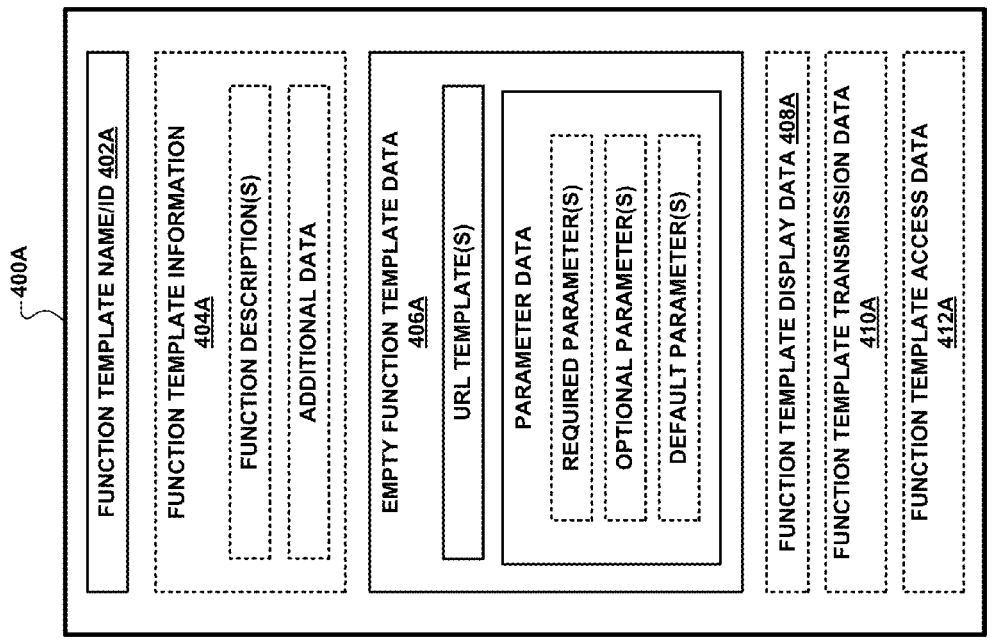

FIGS. 4A-4B illustrate example function template records that may be included in the data store 112. FIG. 4A illustrates a general example of a function template record 400A. The function template record 400A of FIG. 4A includes information related to (e.g., specifying) an empty function template 216. As described herein, an empty function template 216 may correspond to a URL template that references a software app and indicates one or more operations for the app to perform based on one or more parameters. As also described herein, the URL template may include one or more fields configured to include the parameters. The function template record 400A may generally represent data stored in the data store 112 that is related to an empty function template 216. The data store 112 may include one or more function template records each having a similar structure as that of the function template record 400A. In other words, the data store 112 may include one or more function template records each having a function template name/ID, function template information, and one or more empty function templates, which are described in greater detail herein. Each function template record may further include one or more of function template display data, function template transmission data, and function template access data, which are also described in greater detail herein.

As shown in FIG. 4A, the function template record 400A includes a function template name/ID 402A that uniquely identifies the record 400A among other function template records included in the data store 112. In some examples, the function template name/ID 402A may describe the software app and the operations (e.g., the function performed by the app) associated with the empty function template 216 specified by the function template record 400A. Additionally, or alternatively, the function template name/ID 402A may include an alphanumeric ID (e.g., an index) associated with the empty function template 216 specified by the function template record 400A, which may be assigned to the record 400A by the local function broadcaster 100. In general, the function template name/ID 402A may be a string of alphabetic, numeric, and/or symbolic characters (e.g., punctuation marks) that uniquely identify the function template record 400A among other function template records included in the data store 112.

As further shown, the function template record 400A includes function template information 404A (e.g., text) that describes the empty function template 216 specified by the record 400A. For example, the function template information 404A may describe the software app and the operations (e.g., the function performed by the app) associated with the empty function template 216. The function template information 404A may include one or more data fields that indicate one or more function descriptions that describe the operations (e.g., the function) and/or the outcome of the software app performing the operations (e.g., the function). The function template information 404A may also include additional data fields configured to indicate other information. In some examples, the function template information 404A may be provided to the local function broadcaster 100 by one or more users of the configuration device(s) 106 (e.g., as configuration data 220). In these examples, the function template record generation module 110 may receive the function template information 404A from the configuration device(s) 106 and store the information 404A in the function template record 400A. In other examples, the local function broadcaster 100 (e.g., using the function template record generation module 110) may generate and store the function template information 404A.

As also shown, the function template record 400A includes empty function template data 406A that may be used to generate the empty function template 216 specified by the record 400A. For example, as shown, the empty function template data 406A may include one or more URL templates (e.g., alphanumeric strings that each reference a software app and indicate one or more operations for the app to perform based on one or more parameters that may be included in one or more fields of the string). As further shown, the empty function template data 406A may also include parameter data associated with the URL templates and including one or more required parameters, optional parameters, and/or default parameters. The required parameters may indicate, for each of the URL templates, which fields of the template are required to include user-specified parameters for the template to function as a URL (e.g., for the associated software app to perform the operations indicated by the template based on the parameters included in the fields of the template). The required parameters may also indicate the types (e.g., examples) of user-specified parameters (e.g., all possible parameters, or parameter ranges) that may be included in these so-called "required" fields of the URL template. The optional parameters may indicate, for each URL template, which fields of the template may or may not include any user-specified parameters for the template to function as a URL. The optional parameters may also indicate the types of user-specified parameters that may be included in these so-called "optional" fields. The default parameters may indicate, for each URL template, which fields of the template are to include default (e.g., pre-populated) parameters, which users may change or leave unchanged. In these examples, upon the URL template being selected from the function template record 400A and included in an empty function template 216, the default parameters may be included in these so-called "default" fields of the URL template.

In the example of FIG. 4A, the function template record retrieval module 300 may initially retrieve the function template record 400A from the data store 112 (e.g., based on the function template transmission data 410A). The function template generation module 108 may then select one or more of the URL templates and the parameter data (e.g., one or more of the required, optional, and/or default parameters) from the empty function template data 406A of the function template record 400A. In some examples, the function template generation module 108 may also select other information (e.g., function template display data 408A, function template transmission data 410A, and/or function template access data 412A) from the function template record 400A. The function template generation module 108 may then generate the empty function template 216 specified by the function template record 400A based on the information selected from the record 400A. For example, the function template generation module 108 may generate the empty function template 216 to include one of the URL templates and one or more or the parameters included in the parameter data. In some examples, the function template generation module 108 may generate the empty function template 216 to include the URL template and the required parameters (e.g., data indicating which fields of the URL template require user-specified parameters and/or the types of parameters allowed therein). In other examples, the function template generation module 108 may generate the empty function template 216 to include the URL template and the optional parameters (e.g., data indicating which fields of the URL template may or may not include user-specified parameters and/or the types of parameters allowed therein). Additionally or alternatively, the function template generation module 108 may generate the empty function template 216 to include the URL template and the default parameters (e.g., in one or more fields of the URL template, or as a separate data structure that is broadcast along with the URL template).

As shown in FIG. 4A, the function template record 400A may also optionally include one or more of function template display data 408A, function template transmission data 410A, and function template access data 412A. The function template display data 408A may include any of text, image, audio, video (e.g., animation), and formatting (e.g., rendering) data. For example, the function template display data 408A may specify one or more GUI elements (e.g., including text, image, formatting, and/or any other data) that the mobile user device(s) 102 may use to display the empty function template 216 specified by the function template record 400A upon receiving the template 216 from the local function broadcaster 100.

The function template transmission data 410A may indicate any information related to whether and when the function template record 400A is retrieved from the data store 112 and the corresponding empty function template 216 is generated and broadcast. For example, the function template transmission data 410A may include date data, time data, and/or other information that indicates when and/or how frequently the empty function template 216 specified by the function template record 400A is generated and broadcast via the local wireless network 104 by the local function broadcaster 100.

The function template access data 412A may include any information that indicates which of the mobile user device(s) 102 are able to receive and/or access the empty function template 216 specified by the function template record 400A. For example, the function template access data 412A may indicate whether the mobile user device(s) 102 may receive and/or access the empty function template 216 with or without user account credentials, such as usernames, passwords, or authentication tokens, associated with the template 216, the software app referenced by the template, and/or the local function broadcaster 100.

FIG. 4B illustrates a specific example of a function template record 400B that specifies an empty function template 216. The empty function template 216 specified by the function template record 400B references a software (e.g., native, or web-based) app associated with the hotel Hilton Garden Inn located in Mountain View, Calif. The empty function template 216 further indicates one or more operations (e.g., a function) for the software app to perform based on one or more parameters that may be included in one or more fields of the template 216. Specifically, the empty function template 216 causes the software app to reserve a hotel room at the Hilton Garden Inn hotel using one or more user-specified parameters that may be specified by a user of one of the mobile user device(s) 102 and included in the fields of the template 216.

As shown in FIG. 4B, the function template record 400B includes a function template name/ID "HILTON GARDEN INN, MOUNTAIN VIEW, CA" 402B that uniquely identifies the record 400B among other function template records included in the data store 112. In other examples, the function template name/ID 402B may be a numeric value, or have another (e.g., machine-readable) representation. In some examples, the function template name/ID 402B may describe the software app and the operations (e.g., the function performed by the app, such as reserving a hotel room) associated with the empty function template 216 specified by the function template record 400B. As further shown, the function template record 400B includes function template information 404B that describes the empty function template 216 specified by the record 400B. In the example of FIG. 4B, the function template information 404B includes the string "RESERVE A HOTEL ROOM FOR TONIGHT AT THE HILTON GARDEN INN, MOUNTAIN VIEW, CA" that describes the operations (e.g., the function of reserving a hotel room) performed by the software app associated with the empty function template 216.

As further shown, the function template record 400B includes empty function template data 406B that may be used to generate the empty function template 216 specified by the function template record 400B. For example, as shown, the empty function template data 406B includes a URL template "Hilton://BookRoomTonight/{Adults}; {credit card #};?children={ . . . } . . . " In this example, the URL template may include one or more additional fields (not shown). As also shown, the empty function template data 406B includes parameter data associated with the URL template, including required parameters, optional parameters, and default parameters. The required parameters indicate that the fields "{Adults}" and "{credit card #}" of the URL template are required to include user-specified parameters for the template to function as a URL. In some examples, the required parameters may further indicate the types (e.g., examples) and/or ranges of parameters that may be included in these required fields (e.g., "{Adults}=integer, 2, >0" and "{credit card #}=integer, 16"). The optional parameters indicate that the fields "?children={ . . . }", "room type={ . . . }", and "{checkout date}" of the URL template may or may not include user-specified parameters for the template to function as a URL. The default parameters indicate that the field "{Adults}" of the URL template is to be pre-populated with a value "2," indicating two adults. The default parameters further indicate that the field "room type={ . . . }" of the URL template is to be pre-populated with a room type that is appropriate for the number of adults indicated in the field "{Adults}" (e.g., using a function "getroomtype(Adults)" that returns the appropriate room type). The default parameters also indicate that the field "checkout date" of the URL template is to be pre-populated with the date of the following day (e.g., using the function "(next day)" that returns the date).

As also shown, the function template record 400B includes function template display data 408B, function template transmission data 410B, and function template access data 412B. The function template display data 408B includes text, image, and formatting (e.g., rendering) data that the mobile user device(s) 102 may use to display the empty function template 216 specified by the function template record 400B upon receiving the template 216 from the local function broadcaster 100 via the local wireless network 104. The function template transmission data 410B indicates whether and when the function template record 400B is retrieved from the data store 112 and the empty function template 216 specified by the record 400B is generated and broadcast by the local function broadcaster 100 via the local wireless network 104. As shown, the function template transmission data 410B includes time data ("6:00 AM-10:00 PM") and date data ("MON-FRI; SUN") that indicate when and/or how frequently the empty function template 216 is generated and broadcast. The function template access data 412B indicates which of the mobile user device(s) 102 are able to receive and/or access the empty function template 216 specified by the function template record 400B. As also shown, the function template access data 412B indicates that the empty function template 216 is accessible to all mobile user device(s) 102 without required user account credentials (e.g., usernames, passwords, or authentication tokens). In other examples, the function template access data 412B may specify one or more usernames, passwords, or other authentication data (e.g., tokens) required for a mobile user device 102 to receive and/or access the empty function template 216.

Figure 5A:
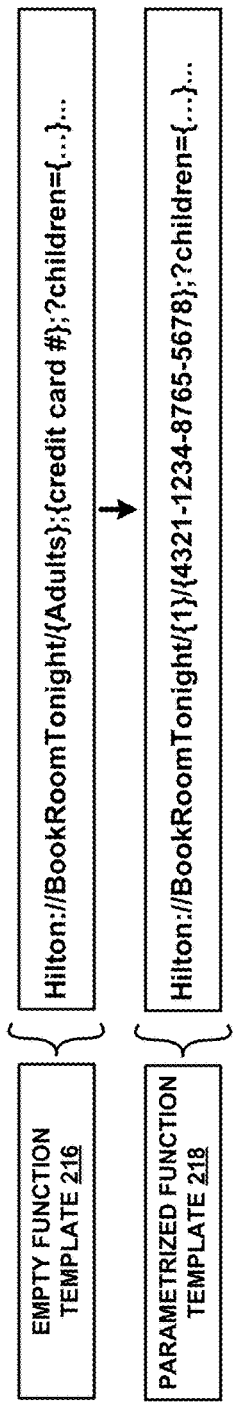
FIGS. 5A-5C depict example function templates.
Figure 5B:
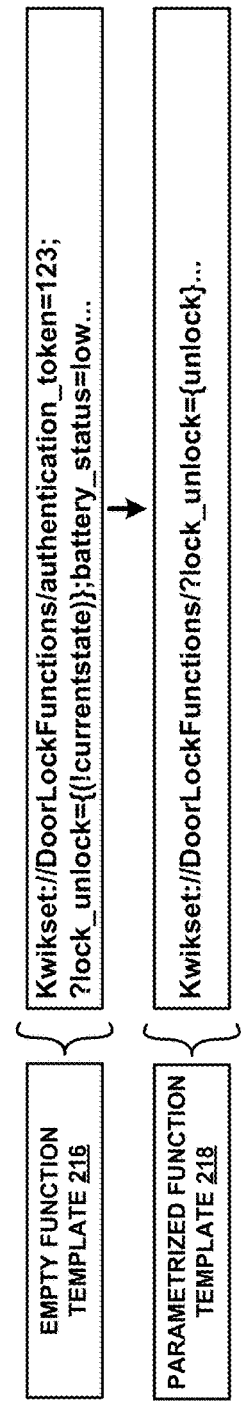
Figure 5C:
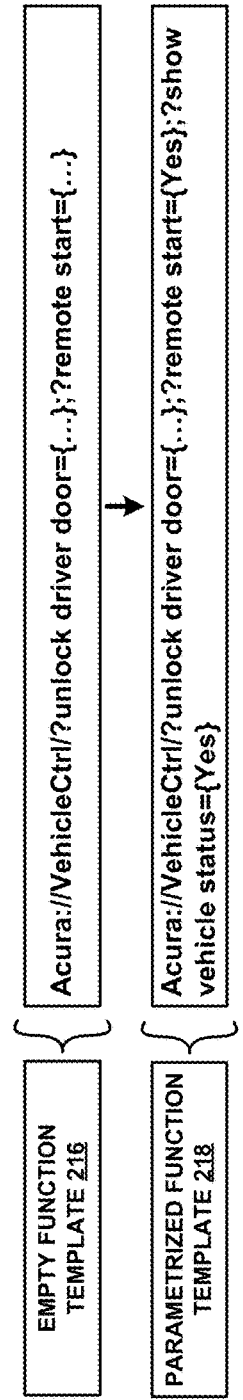

FIGS. 5A-5C depict example empty function templates 216 and parametrized function templates 218. FIG. 5A depicts an example empty function template 216 and an example parametrized function template 218 each specifying a function associated with a particular Hilton Garden Inn hotel located in Mountain View, Calif. The empty function template 216 of FIG. 5A is a URL template that references a native or web-based hotel booking app associated with the Hilton Garden Inn hotel and indicates one or more operations for the app to perform based on one or more parameters that may be included in one or more fields of the URL template. The hotel booking app performing the operations indicated by the empty function template 216 causes the app to reserve a hotel room at the Hilton Garden Inn hotel. The parametrized function template 218 of FIG. 5A, in turn, is a URL that includes the empty function template 216 (e.g., the URL template) and one or more user-specified parameters in the fields of the empty function template 216 (e.g., in the fields of the URL template). The user-specified parameters may be specified by a user of one of the mobile user device(s) 102. The hotel booking app performing the operations indicated by the parametrized function template 218 based on the user-specified parameters included in the fields of the template 218 causes the app to reserve a room at the Hilton Garden Inn hotel for a particular day, for a given duration, and/or with specific accommodations (e.g., a room type) indicated by the user via the parameters. In this example, the user specifies user-specified parameters "1" and "4321-1234-8765-5678" to be included in required fields "{Adults}" and "{credit card #}," respectively, of the parametrized function template 218. Also in this example, the user refrains from specifying a user-specified parameter for the optional field "?children={ . . . }" of the parametrized function template 218.

FIG. 5B depicts an example empty function template 216 and an example parametrized function template 218 each specifying a function associated with a specific Kwikset® smart door lock installed in a residence. The empty function template 216 of FIG. 5B is a URL template, in a similar manner as described with reference to FIG. 5A. In this example, a native or web-based lock app associated with the smart door lock performing the operations indicated by the empty function template 216 causes the app to lock or unlock the lock.

As shown in FIG. 5B, the empty function template 216 includes an authentication token configured to enable a particular one of the mobile user device(s) 102 to receive the template 216 from the local function broadcaster 100 via the local wireless network 104 and/or access the template 216 (e.g., display the template 216 to a user of the device 102). For example, for the mobile user device 102 to receive and/or access the empty function template 216, the device 102 may require authentication data (e.g., another authentication token) that authenticates the device 102 using (e.g., that matches) the authentication token included in the template 216. As further shown, the empty function template 216 also includes a default parameter in a field "?lock unlock={ . . . }" of the template 216. For example, as shown, the default parameter may be generated (e.g., by the local function broadcaster 100 prior to broadcasting the empty function template 216) using a function "(!currentstate)" that returns the string "unlock" in the event the smart door lock is locked, and the string "unlock" otherwise (e.g., returns the opposite of a current "locked/unlocked" state of the lock). As also shown, the empty function template 216 may indicate other (e.g., diagnostic) information associated with the smart door lock, such as a battery status, or "level," of the lock, and/or other information regarding the lock. Upon receiving the empty function template 216, a mobile user device 102 may display this additional information, e.g., with the template 216. The parametrized function template 218 of FIG. 5B is a URL that includes the empty function template 216 and one or more user-specified parameters specified by a user of one of the mobile user device(s) 102, in a similar manner as described with reference to FIG. 5A. As described herein, to generate the parametrized function template 218, the mobile user device 102 may initially determine that the device 102 is able to receive and/or access the empty function template 216 using the authentication token included in the template 216. In this example, the lock app associated with the smart door lock performing the operations indicated by the parametrized function template 218 based on the user-specified parameters included in the fields of the template 218 causes the app to unlock the lock. Specifically, as shown, the user specifies a user-specified parameter "unlock" to be included in the field "?lock unlock={ . . . }" of the parametrized function template 218.

FIG. 5C depicts an example empty function template 216 and an example parametrized function template 218 each specifying a function associated with a specific Acura® vehicle. The empty function template 216 of FIG. 5C is a URL template, in a similar manner as previously described. In this example, a native or web-based app associated with the vehicle performing the operations indicated by the empty function template 216 causes the vehicle to perform one or more functions, including locking or unlocking the driver-side door of the vehicle, starting the vehicle (e.g., performing a so-called "remote" start), and/or any other functions associated with the vehicle. The parametrized function template 218 of FIG. 5C is a URL that includes the empty function template 216 of FIG. 5C and one or more user-specified parameters specified by a user of one of the mobile user device(s) 102, also in a similar manner as previously described. In this example, the vehicle app performing the operations indicated by the parametrized function template 218 based on the user-specified parameters causes the app to start the vehicle and transmit to the mobile user device 102 an indication of vehicle status associated with the vehicle. Specifically, as shown, the user specifies a user-specified parameter "Yes" to be included in a field "?remote start= { . . . }" of the parametrized function template 218. As also shown, the user further specifies a user-specified parameter "Yes" to be included in a field "?show vehicle status= { . . . }" of the parametrized function template 218. In this example, the field "?show vehicle status={ . . . }" may correspond to an additional field appended to (e.g., a field not originally included in) the empty function template 216 by the mobile user device 102 as part of generating the parametrized function template 218.

In some examples (not shown), to generate the parametrized function template 218, the mobile user device 102 may initially determine that the device 102 is able to receive and/or access the empty function template 216 using access data (e.g., user account credentials, such as a username, a password, or an authentication token) included in the template 216 or received separately from the template 216. In other examples (also not shown), the mobile user device 102 may receive the access data and determine that the device 102 is able to receive and/or access the empty function template 216 using the data and user account credentials associated with the device 102. In these examples, the mobile user device 102 may generate the parameterized function template 218 to indicate (e.g., include) the user account credentials.

FIGS. 6A-6C depict example GUIs that may be generated on one of the mobile user device(s) 102 according to this disclosure. In particular, the examples of FIGS. 6A-6C depict the mobile user device 102 receiving empty function templates 216 and generating parametrized function templates 218. As shown in FIG. 6A, the mobile user device 102 (e.g., in response to receiving an input from a user of the device 102) may initially launch a local function broadcaster app (e.g., via the web browser app 202, or by launching any of the native app(s) 204). The local function broadcaster app may receive one or more empty function templates 216 from the local function broadcaster 100 via the local wireless network 104. For example, the local function broadcaster app may first perform a scan for any local wireless networks 104 that are within range of the mobile user device 102. Upon detecting a particular local wireless network 104, the local function broadcaster app may await (e.g., listen for) a broadcast of one or more empty function templates 216 via the network 104. In response to detecting the broadcast, the local function broadcaster app may receive the empty function templates 216 via the local wireless network 104. As shown in FIG. 6B and further described herein, the local function broadcaster app may also display the received empty function templates 216 to the user.

In particular, the local function broadcaster app may display the received empty function templates 216 as function results 600-1 . . . 600-2 (collectively, the "function results 600"). For example, the local function broadcaster app may generate each function result 600 using one of the empty function templates 216 and, e.g., additional data also received from the local function broadcaster 100 via the local wireless network 104. For instance, the local function broadcaster app may generate each function result 600 using one of the empty function templates 216 and (e.g., global)

function template display data received with the template 216, or separately from the template 216, as described herein. As shown in FIG. 6B, each function result 600 may include one or more GUI elements (e.g., GUI elements 602-1 . . . 602-4). The GUI elements (e.g., 602-1 and 602-3) included in each function result 600 may indicate one or more fields and/or data that may be included in the fields of the corresponding one of the empty function templates 216. The GUI elements may further indicate which of the fields are required fields and/or optional fields. The GUI elements may also indicate one or more example and/or default parameters that may be included in the fields. For example, the local function broadcaster app may generate the GUI elements using parameter data received with the corresponding empty function template 216, or separately from the template 216.

In this example, for each function result 600, the user may specify one or more user-specified parameters to be included in the fields of the corresponding empty function template 216. For example, the user may specify the user-specified parameters by touching, or clicking on, the GUI elements of the function result 600 that are associated with the fields. In some examples, one or more of the fields may include default parameters, which the user may change, or leave unchanged. The GUI elements may also include one or more user-selectable links that, when selected (e.g., touched, or clicked on) by the user, cause the local function broadcaster app to parametrize the corresponding empty function template 216 using the user-specified parameters. As a result, the local function broadcaster app may generate a parametrized function template 218 that includes the empty function template 216 and the user-specified parameters in one or more of the fields of the empty function template 216. The local function broadcaster app may then transmit the parametrized function template 218 to the local function broadcaster 100 via the local wireless network 104, as described herein.

As shown in FIG. 6C, in some examples, the GUI elements (e.g., 602-2 and 602-4) may also include one or more user-selectable links that, when selected by the user, cause the local function broadcaster app to expand the corresponding function result 600 and display one or more additional fields, parameters, and/or user-selectable links associated with the result 600 (e.g., with the corresponding empty function template 216). In these examples, upon the local function broadcaster app expanding the function result 600, the user may specify one or more additional user-specified parameters to be included in the additional fields. For example, as shown in FIG. 6B, the user may select the GUI element 602-2, which references additional functions associated with the function result 600-1 corresponding to reserving a room at a particular Hilton Garden Inn hotel. As shown in FIG. 6C, upon the user selecting the GUI element 602-2, the local function broadcaster app may expand the function result 600-1, thereby generating an expanded GUI element 600-5 that displays additional fields, parameters, and/or user-selectable links associated with with the result 600-1 (e.g., with the corresponding empty function template 216). As also shown, the user may then specify one or more additional user-specified parameters to be included in the additional fields. For example, as shown in FIG. 6C, the user may indicate a number of adults, the user's credit card number, a room type, and a check-out date used to reserve a hotel room at the Hilton Garden Inn hotel. The user may then select a user selectable link included in the GUI element 600-5, causing the local function broadcaster app to generate the corresponding parametrized function template 218 and transmit the template 218 to the local function broadcaster 100 via the local wireless network 104. In some examples, the local function broadcaster app may augment the empty function template 216 to include the additional fields and user-specified parameters (e.g., append the fields and parameters to the template 216) as part of generating the parametrized function template 218. In these examples, the local function broadcaster 100 (e.g., the parametrized function template response module 308) may be configured to cause the software app referenced by the parametrized function template 218 to perform the operations indicated by the template 218 based on the additional fields and user-specified parameters.

As shown in FIGS. 6A-6C, in some examples, the local function broadcaster app may order (e.g., arrange) the function results 600 (e.g., the GUI elements) in a list. For example, the local function broadcaster app may order each function result 600 (and, e.g., the corresponding GUI elements) based on a result score associated with (e.g., received with, or generated for) the result 600. As also shown, in some examples, the local function broadcaster app may include a search GUI. The search GUI may include search field, or "box," 212 into which the user may enter a search query 210. The user may then interact with a search button 214 of the search GUI to cause the local function broadcaster app to search for one or more specific empty function templates 216 received by the app (e.g., one or more particular function results 600 generated and displayed by the app using the templates 216) using the search query 210.

Figure 7:
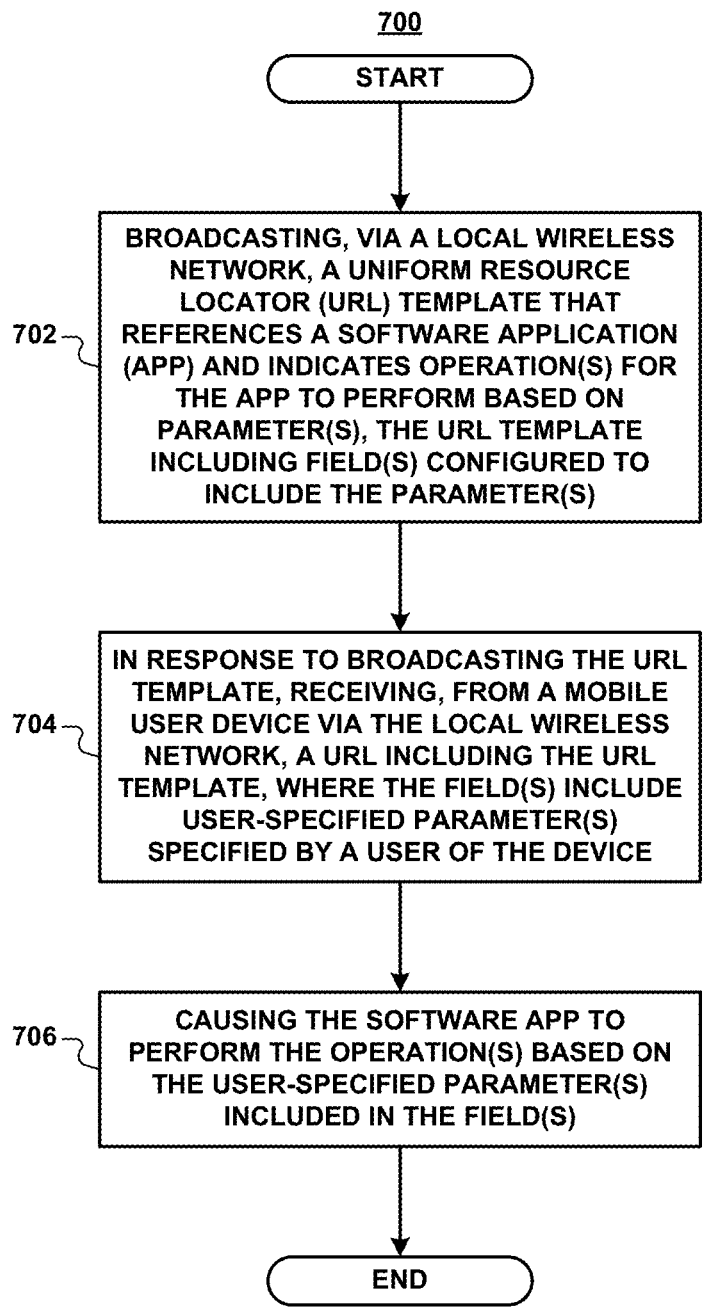
FIG. 7 is a flow diagram that illustrates an example method for broadcasting an empty function template and receiving a parametrized function template from a mobile user device using a local function broadcaster.

FIG. 7 is a flow diagram that illustrates an example method 700 for broadcasting an empty function template 216 and receiving a parametrized function template 218 from a mobile user device 102 using a local function broadcaster 100. As shown in FIG. 7, in block 702, the local function broadcaster 100 may initially broadcast, via the local wireless network 104, a URL template that references a software app (e.g., a native or web-based app) and indicates one or more operations (e.g., a function) for the app to perform based on one or more parameters (e.g., alphabetic, numeric, and/or symbolic characters). As described herein, the URL template may include one or more fields (e.g., placeholders) configured to include the parameters.

In this example, upon the local function broadcaster 100 broadcasting the URL template via the local wireless network 104, one of the mobile user device(s) 102 located near the broadcaster 100 (e.g., within range of the network 104) may receive the template via the network 104. The mobile user device 102 may further generate a URL that includes (e.g., that is generated based on) the URL template, such that the fields included in the template include one or more user-specified parameters (e.g., alphabetic, numeric, and/or symbolic characters) that are specified by a user of the device 102. The mobile user device 102 may then transmit the URL to the local function broadcaster 100 via the local wireless network 104.

Accordingly, in block 704, in response to broadcasting the URL template, the local function broadcaster 100 may receive, from the mobile user device 102 via the local wireless network 104, the URL including the URL template. As described herein, the fields of the URL template included in the URL received from the mobile user device 102 may include one or more user-specified parameters specified by a user of the device 102. In block 706, the local function broadcaster 100 may cause the software app to perform the operations (e.g., the function) based on the user-specified parameters included in the fields of the URL template included in the URL.

Figure 8:
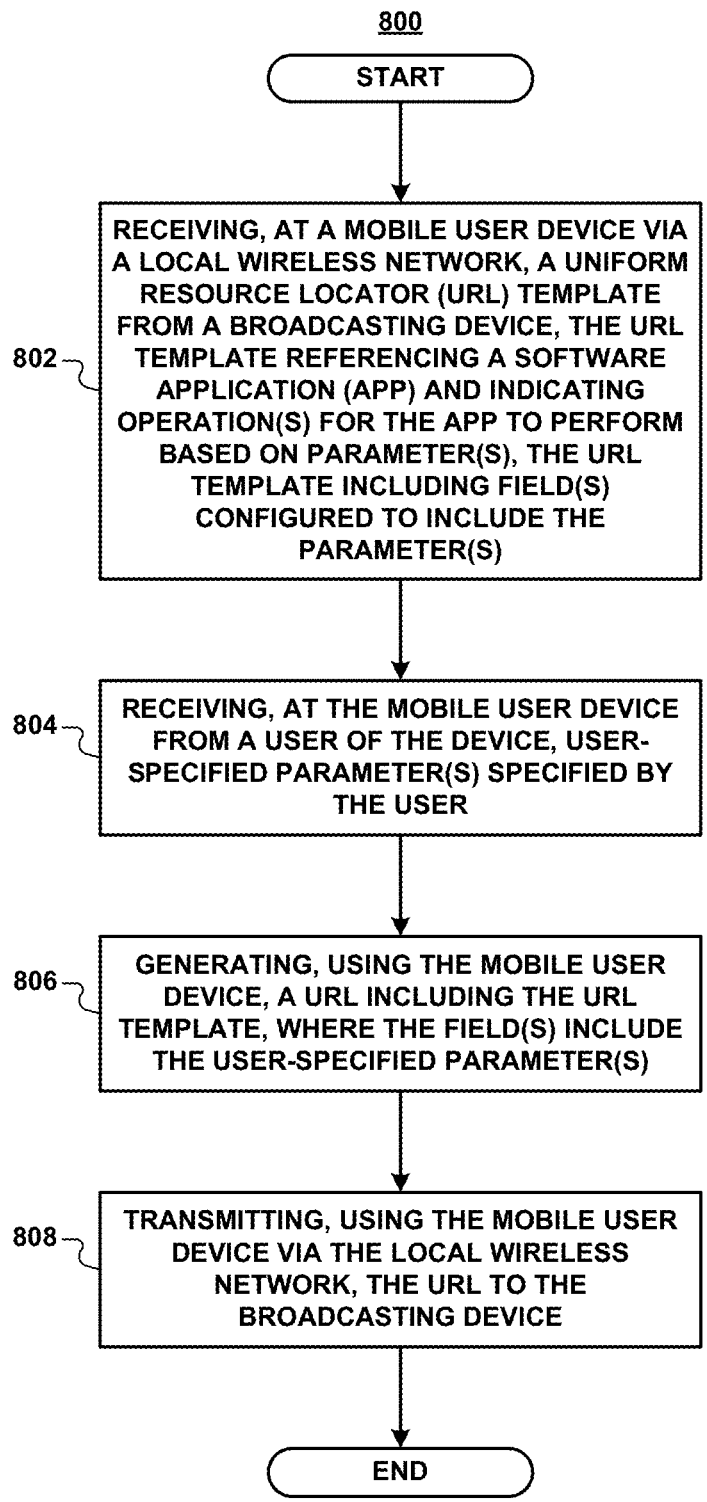
FIG. 8 is a flow diagram that illustrates an example method for parametrizing an empty function template received from a local function broadcaster using a mobile user device.

FIG. 8 is a flow diagram that illustrates an example method 800 for parametrizing an empty function template 216 received from a local function broadcaster 100 using one of the mobile user device(s) 102. As shown in FIG. 8, in block 802, the mobile user device 102 may initially receive, via the local wireless network 104, a URL template from a broadcasting device (e.g., the local function broadcaster 100). As described herein, the URL template may reference a software app (e.g., a native or web-based app) and indicate one or more operations (e.g., a function) for the app to perform based on one or more parameters (e.g., alphabetic, numeric, and/or symbolic characters). As also described herein, the URL template may include one or more fields (e.g., placeholders) configured to include the parameters. In this example, the broadcasting device may broadcast the URL template via the local wireless network 104 to any of the mobile user device(s) 102 that are located proximate to (e.g., near) the broadcasting device (e.g., within range of the network 104).

In block 804, the mobile user device 102 may receive, from a user of the device 102, one or more user-specified parameters (e.g., alphabetic, numeric, and/or symbolic characters) that are specified by the user. In some examples, to receive the user-specified parameters from the user, the mobile user device 102 may provide a user prompt (e.g., display a GUI) to the user and receive the parameters from the user in response to providing the prompt.

In block 806, the mobile user device 102 may generate a URL that includes (e.g., that is generated based on) the URL template. As described herein, the mobile user device 102 may generate the URL such that the fields of the URL template included in the URL include the user-specified parameters received from the user of the device 102. In block 808, the mobile user device 102 may transmit, via the local wireless network 104, the URL to the broadcasting device (e.g., the local function broadcaster 100).

The modules and data stores included in the local function broadcaster 100 represent features that may be included in the broadcaster 100 as it is described in the present disclosure. For example, the function template generation module 108, function template record generation module 110, and data store 112 may represent features included in the local function broadcaster 100. The modules and data stores described herein may be embodied by electronic hardware, software, and/or firmware. Depiction of different features as separate modules and data stores does not necessarily imply whether the modules and data stores are embodied by common or separate electronic hardware, software, and/or firmware components. In some implementations, the features associated with the modules and data stores depicted herein may be realized by one or more common or separate electronic hardware, software, and/or firmware components.

The modules and data stores may be embodied by electronic hardware, software, and/or firmware components including, but not limited to, one or more processing units, memory components, input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, solid state drives (SSDs), hard disk drives (HDDs), magnetic tape drives, optical storage technology (e.g., compact disc, digital versatile disc, and/or Blu-ray disc), or any other memory components. The memory components may include (e.g., store) the data described herein. For example, the memory components may store the data included in the one or more function template records 400 of the data store 112. The memory components may also include instructions executed by the processing units. For example, the memory components may include computer-readable instructions that, when executed by the processing units, cause the units to perform the various functions attributed to the modules and data stores described herein.

The I/O components may refer to electronic hardware, software, and/or firmware that provide communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may include hardware, software, and/or firmware configured to communicate with additional devices, such as external memory (e.g., external HDDs).

In some examples, the local function broadcaster 100 may be a system of one or more computing devices (e.g., a computerized broadcasting system) configured to implement the techniques described herein. Put another way, the features attributed to the modules and data stores described herein may be implemented by one or more computing devices. Each computing device may include any combination of electronic hardware, software, and/or firmware described herein. For example, each computing device may include any combination of the one or more processing units, memory components, I/O components, and interconnect components described herein. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the local function broadcaster 100 may be configured to communicate with the local wireless network 104. The computing devices may also be configured to communicate with one another via a computer network. In some examples, the computing devices may include one or more server computing devices configured to communicate with the mobile user device(s) 102 (e.g., transmit empty function templates 216 and receive parametrized function templates 218), gather data from various data sources, index the data, store the data, and store other documents. In other examples, the computing devices may reside within a single machine at a single geographic location, within multiple machines at a single geographic location, or be distributed across a number of geographic locations.

Additionally, the various implementations of the local function broadcaster 100 described herein (e.g., using one or more computing devices that include one or more processing units, memory components, I/O components, and interconnect components) may be equally applicable to any of the mobile user device(s) 102 and the configuration device(s) 106, as well as to the various components thereof.

I claim:

1. A method comprising:
   maintaining a data store with a plurality of uniform resource locator (URL) templates for a plurality of software applications, wherein each of the URL templates references a software application from among the plurality of software applications and indicates one or more operations for the software application to perform based on one or more parameters, wherein each of the URL templates includes one or more fields configured to include the one or more parameters;
   receiving, from a mobile user device via a local wireless network, a search query;
   identifying, by a local broadcaster, at least one of URL templates from among the URL templates related to the search query;
   broadcasting, via the local wireless network, the at least one of URL templates;
   in response to broadcasting the at least one of URL templates, receiving, from the mobile user device via the local wireless network, a URL comprising a first URL template of the at least one of URL templates, wherein the one or more fields include one or more user-specified parameters specified by a user of the mobile user device;
   identifying a first software application(app) referenced by the first URL template based on the URL; and
   causing the first software app to perform the one or more operations based on the one or more user-specified parameters included in the one or more fields.

2. The method of claim 1, further comprising:
   broadcasting, via the local wireless network, parameter data that indicates, for at least one of the one or more fields included in the first URL template, that each of the one or more fields is required to include a parameter,
   wherein at least one of the one or more user-specified parameters is included in each of the one or more fields indicated by the parameter data.

3. The method of claim 1, further comprising:
   broadcasting, via the local wireless network, parameter data that indicates, for at least one of the one or more fields included in the first URL template, one or more example parameters that may be included in each of the one or more fields,
   wherein at least one of the one or more user-specified parameters comprises one of the one or more example parameters indicated by the parameter data.

4. The method of claim 1, wherein the broadcasting of the first URL template comprises including, in at least one of the one or more fields included in the first URL template, one or more default parameters that may be included in each of the one or more fields.

5. The method of claim 1, further comprising broadcasting, via the local wireless network, access data indicating one or more conditions under which the mobile user device may perform one or more of receiving the first URL template via the local wireless network or accessing the first URL template.

6. The method of claim 1, further comprising broadcasting, via the local wireless network, access data configured to enable the mobile user device to perform one or more of receiving the first URL template via the local wireless network or accessing the first URL template.

7. The method of claim 1, further comprising:
   receiving, from the mobile user device via the local wireless network, authentication data indicating that the mobile user device may perform one or more of receiving the first URL template via the local wireless network or accessing the first URL template,
   wherein the causing of the first software app to perform the one or more operations comprises causing the first software app to perform the one or more operations based on the authentication data.

8. The method of claim 1,
   wherein the URL further comprises one or more additional fields that include one or more additional user-specified parameters specified by the user, and
   the method further comprising causing the first software app to perform the one or more operations based on the one or more additional user-specified parameters included in the one or more additional fields.

9. The method of claim 1, wherein the local wireless network comprises a Wi-Fi network.

10. The method of claim 1, wherein the local wireless network comprises a Bluetooth network.

11. The method of claim 1, wherein the local wireless network comprises a near field communications (NFC) network.

12. A method comprising:
    receiving, at a mobile user device from a user of the mobile user device, a search query;
    transmitting, using the mobile user device via a local wireless network, the search query to a broadcasting device;
    receiving, at the mobile user device via the local wireless network, at least one of uniform resource locator (URL) templates selected from a plurality of URL templates from the broadcasting device, wherein each of the at least one of URL templates references a software application (app) and indicates one or more operations for the app to perform based on one or more parameters, wherein each of the at least one of URL templates includes one or more fields configured to include the one or more parameters;
    receiving, at the mobile user device from the user of the mobile user device, one or more user-specified parameters specified by the user;
    generating, using the mobile user device, a URL comprising a first URL template of the at least one of URL templates, wherein the one or more fields include the one or more user-specified parameters; and
    transmitting, using the mobile user device via the local wireless network, the URL to the broadcasting device.

13. The method of claim 12, further comprising:
receiving, at the mobile user device from the broadcasting device via the local wireless network, parameter data that indicates, for at least one of the one or more fields included in the at least one of URL templates, one or more example parameters that may be included in each of the one or more fields; and
displaying, at the mobile user device to the user, an indication of the one or more example parameters,
wherein the receiving of the one or more user-specified parameters from the user comprises receiving a selection of the indication of the one or more example parameters from the user.

14. The method of claim 12, further comprising:
receiving, at the mobile user device from the broadcasting device via the local wireless network, access data configured to enable the mobile user device to perform one or more of receiving the at least one of URL templates via the local wireless network or accessing the at least one of URL templates; and
performing one or more of receiving the at least one of URL templates via the local wireless network or accessing the at least one of URL templates based on the access data.

15. The method of claim 12, further comprising:
determining that the mobile user device may perform one or more of receiving the at least one of URL templates via the local wireless network or accessing the at least one of URL templates; and
accessing the at least one of URL templates.

16. The method of claim 12, further comprising:
receiving, at the mobile user device from the user, one or more additional user-specified parameters specified by the user,
wherein the generating of the URL comprises generating the URL to include one or more additional fields that include the one or more additional user-specified parameters.

17. The method of claim 12, further comprising displaying, at the mobile user device to the user, an indication of a geographic location of the broadcasting device.

18. The method of claim 12, wherein the local wireless network comprises one of a Wi-Fi network, a Bluetooth network, and a near field communications (NFC) network.

19. A system comprising one or more computing devices configured to:
maintain a data store with a plurality of uniform resource locator (URL) templates for a plurality of software applications, wherein each of the URL templates references a software application from among the plurality of software applications and indicates one or more operations for the software application to perform based on one or more parameters, wherein each of the URL templates includes one or more fields configured to include the one or more parameters;
receive, from a mobile user device via a local wireless network, a search query;
identify, by a local broadcaster, at least one of URL templates from among the URL templates related to the search query;
broadcast, via the local wireless network, the at least one of URL templates;
in response to broadcasting the at least one of URL templates, receive, from the mobile user device via the local wireless network, a URL comprising a first URL template of the at least one of URL templates, wherein the one or more fields include one or more user-specified parameters specified by a user of the mobile user device;
identify a first software application(app) referenced by the first URL template based on the URL; and
cause the first software app to perform the one or more operations based on the one or more user-specified parameters included in the one or more fields.

20. A computing device comprising:
a network interface component configured to communicate with a local wireless network;
an input/output (I/O) component configured to receive one or more user-specified parameters specified by a user of the computing device from the user;
one or more memory components configured to store computer-readable instructions; and
one or more processors configured to execute the computer-readable instructions, wherein the computer-readable instructions, when executed by the one or more processors, cause the one or more processors to:
receive a search query using the I/O component,
transmit the search query to a broadcasting device using the network interface component,
receive at least one of uniform resource locator (URL) templates selected from a plurality of URL templates from the broadcasting device, wherein each of the at least one of URL templates references a software application (app) and indicates one or more operations for the app to perform based on one or more parameters, wherein each of the at least one of URL templates includes one or more fields configured to include the one or more parameters,
receive the one or more user-specified parameters from the user using the I/O component,
generate a URL comprising a first URL template of the at least one of URL templates, wherein the one or more fields include the one or more user-specified parameters, and
transmit the URL to the broadcasting device via the local wireless network using the network interface component.

* * * * *